United States Patent [19]

Aoyama

[11] Patent Number: 5,604,562
[45] Date of Patent: Feb. 18, 1997

[54] AUTO-ZOOM CAMERA

[75] Inventor: Keisuke Aoyama, Yokohama, Japan

[73] Assignee: Canon Kabushiki Kaisha, Tokyo, Japan

[21] Appl. No.: 593,474

[22] Filed: Jan. 29, 1996

Related U.S. Application Data

[63] Continuation of Ser. No. 160,206, Dec. 2, 1993, abandoned.

[30] Foreign Application Priority Data

Dec. 3, 1992 [JP] Japan ................................. 4-349964

[51] Int. Cl.$^6$ ................................................ G03B 13/36
[52] U.S. Cl. ........................... 396/79; 396/121; 396/123
[58] Field of Search ................................. 354/402–409, 354/400, 195.1, 195.12, 410

[56] References Cited

U.S. PATENT DOCUMENTS

| | | | |
|---|---|---|---|
| 4,954,701 | 9/1990 | Suzuki et al. | 354/406 X |
| 4,980,716 | 12/1990 | Suzuki et al. | 354/403 |
| 4,992,817 | 2/1991 | Aoyama et al. | 354/403 |
| 5,005,041 | 4/1991 | Suda et al. | 354/407 |
| 5,028,773 | 7/1991 | Hata | 354/195.1 X |
| 5,051,766 | 7/1991 | Nonaka et al. | 354/403 X |
| 5,091,742 | 2/1992 | Fukahori et al. | 354/402 |
| 5,138,358 | 8/1992 | Aoyama et al. | 354/403 |
| 5,204,710 | 4/1993 | Tsukamoto et al. | 354/195.1 |
| 5,267,044 | 11/1993 | Nozaki et al. | 354/402 |
| 5,274,409 | 12/1993 | Tokumaru et al. | 354/195.1 |
| 5,291,233 | 3/1994 | Hashimoto et al. | 354/400 |
| 5,307,112 | 4/1994 | Aoyama | 354/406 |

*Primary Examiner*—Russell E. Adams
*Attorney, Agent, or Firm*—Fitzpatrick, Cella, Harper & Scinto

[57] ABSTRACT

A camera incorporating an auto-zoom function and a multi-focus detecting device. In this camera, the auto-zoom function is inhibited when a focus detection area selected is an area other than a central area, thereby performing a proper focus detection.

63 Claims, 19 Drawing Sheets

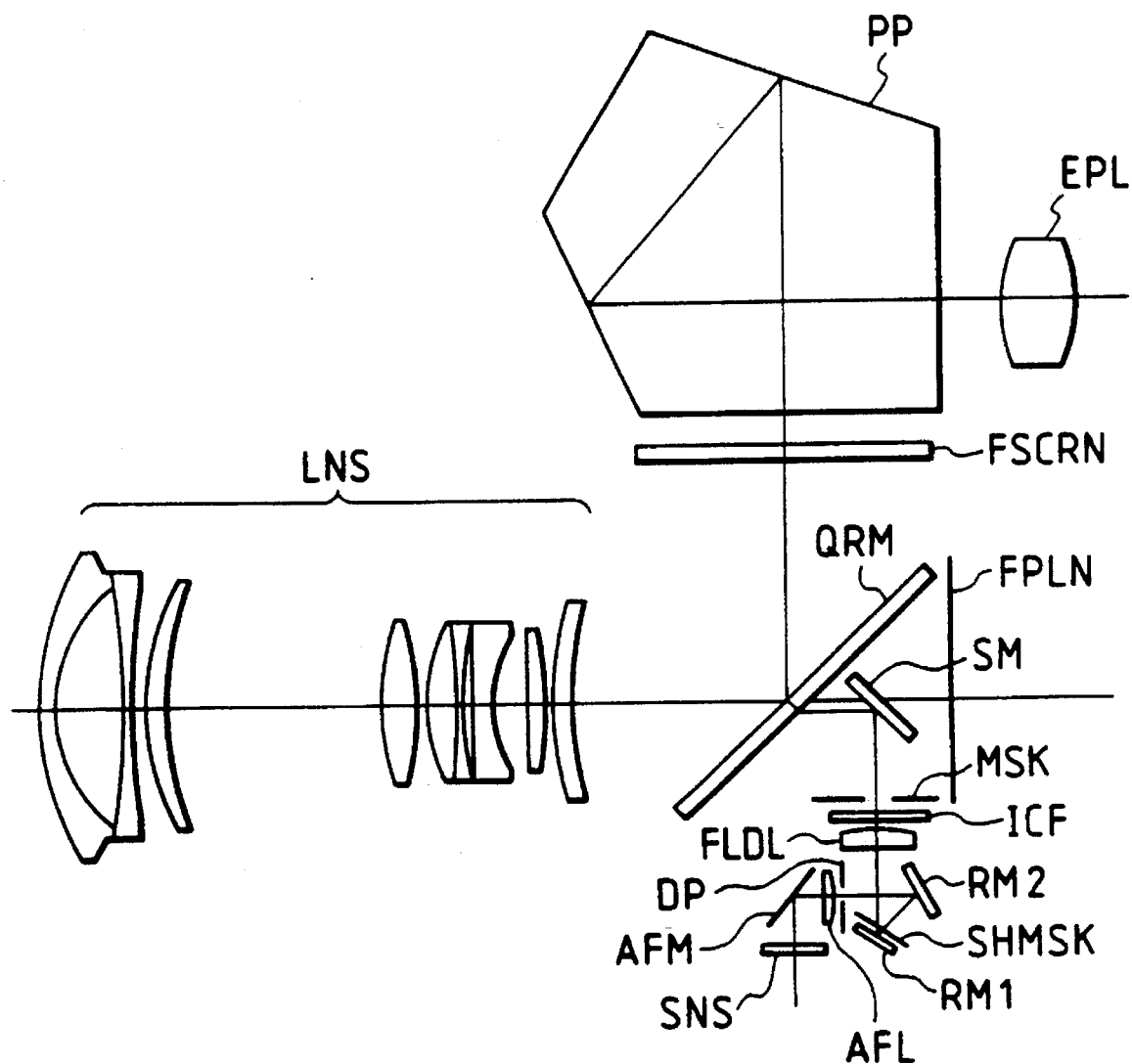

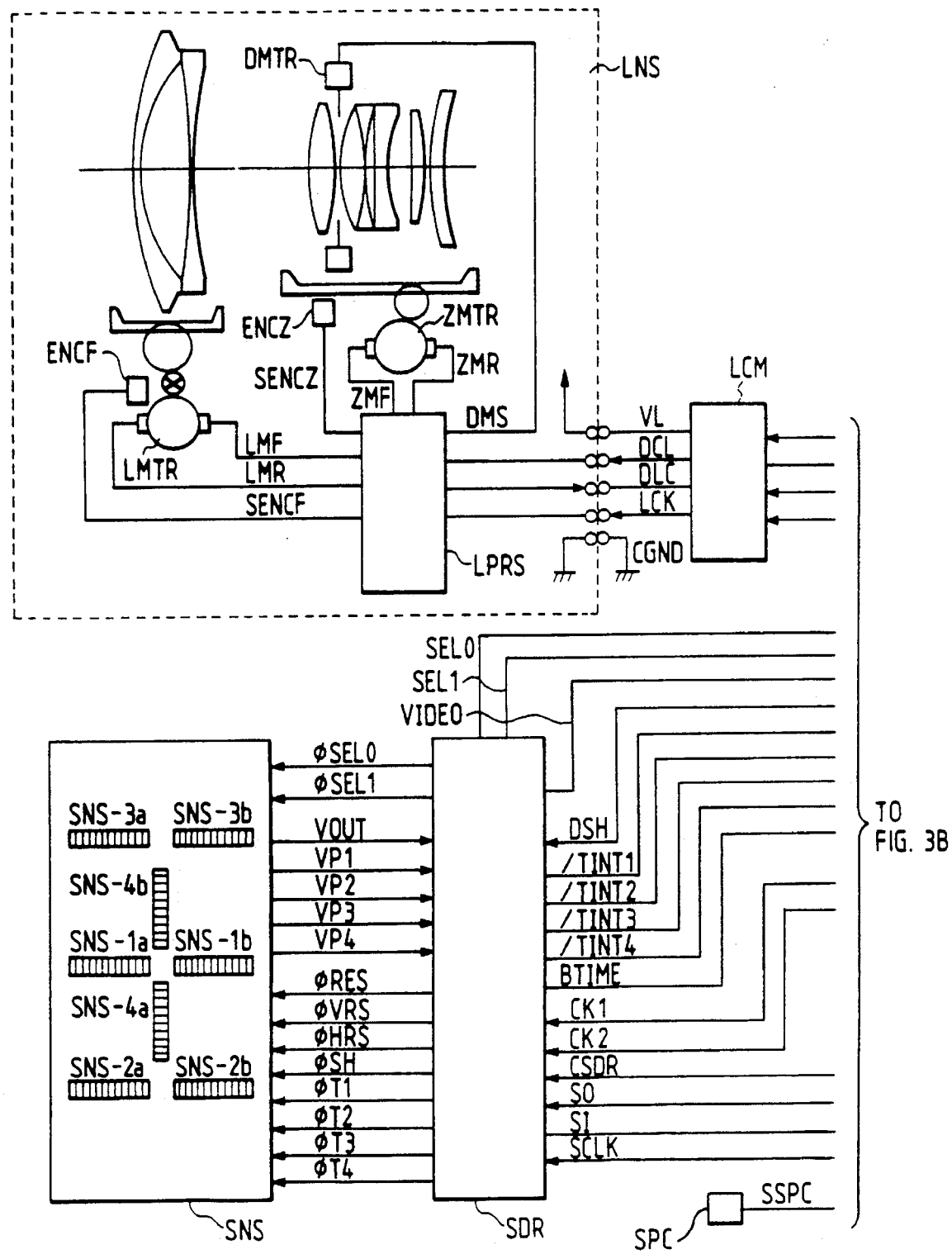

(OUTER LIQUID CRYSTAL DISPLAY PANEL OLC)

(DISPLAY UNIT ILC IN FINDER)

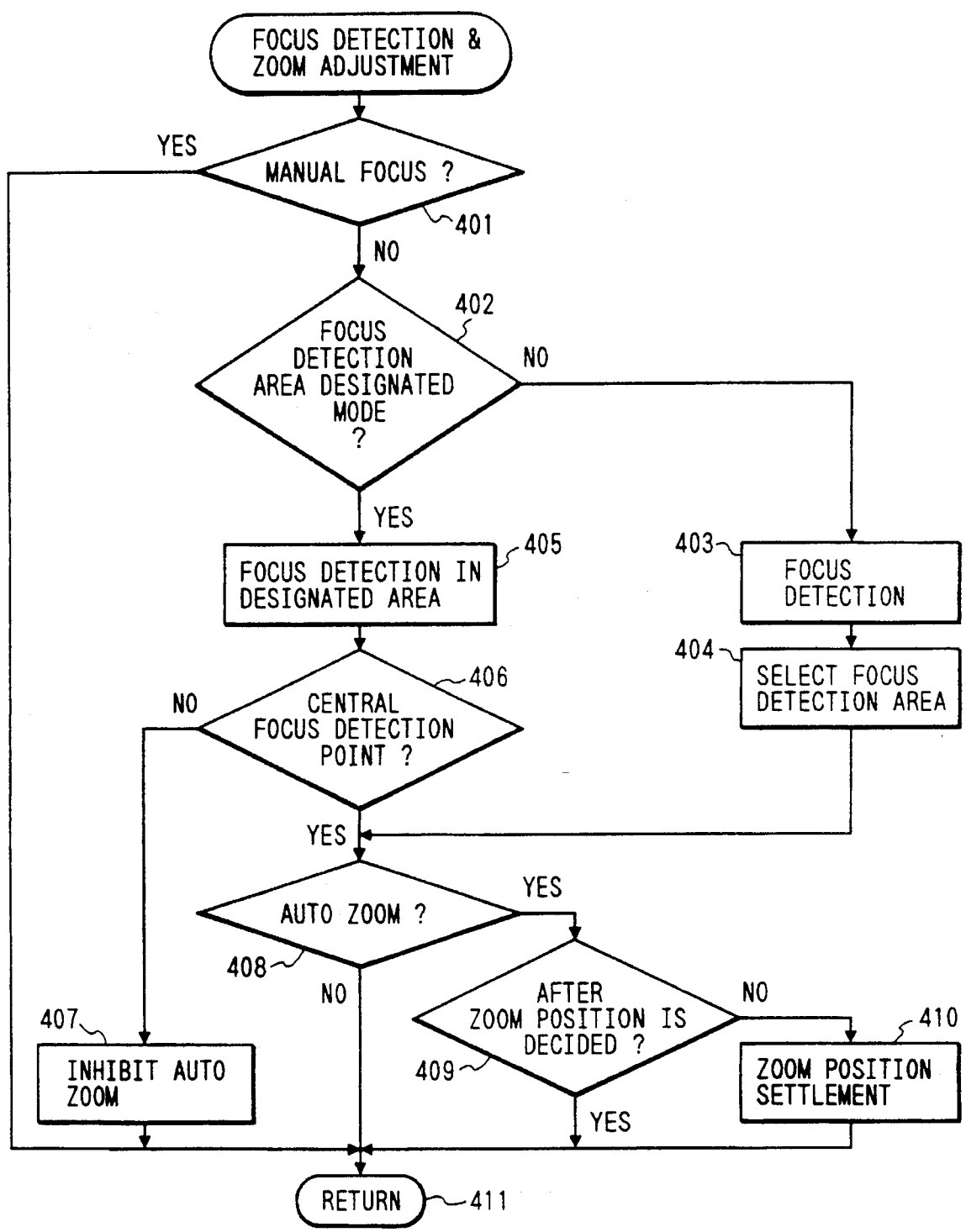

AUTO-ZOOM CAMERA

This application is a continuation of application Ser. No. 08/160,206 filed Dec. 2, 1993, abandoned.

BACKGROUND OF THE INVENTION

1. Field of the Invention

The present invention relates to an improvement of an auto-zoom camera incorporating a function to automatically perform zooming by detecting defocus quantities in a plurality of areas within a picture and effecting a focal adjustment of a photographing lens.

2. Related Background Art

As an auto-focus detecting device of a camera, there has hitherto been well known a focus detection system for detecting a defocus quantity of an object. This involves imaging, on a couple of line sensors, beams of light coming from the object and passing through different exit pupil areas (focus detection areas) of a photographing lens and thereby obtaining a relative position shift quantity of a pair of image signals acquired by photoelectrically converting the object images. Known also is an auto focus adjusting method, wherein a plurality of these focus detecting systems are disposed, and the photographing lens is driven based on the defocus quantities detected with respect to a plurality of object positions.

Then, according to an element for selecting a focus detection area to be focused from the plurality of focus detection systems, there are a cases where the camera automatically selects at least one of a plurality of focus detection areas in accordance with a fixed algorithm and cases where a photographer takes a shot after designating the focus detection area beforehand.

There is also proposed a lens constructed such that the photographing lens serves as a zoom optical system, this is provided with a driving system, a zoom switch of the camera or the lens is manipulated, and the zoom can be thereby adjusted. In addition to manual operations by the photographer, this type of zoom lens is capable of a so-called auto-zoom, wherein the camera automatically adjusts a focal position.

This type of auto-focus camera presents, when selecting the focus detection area and performing the auto-zoom photography, the following drawbacks.

To be specific, when the photographer has some intention to take a picture and personally selects a focus detection area, if the zoom is automatically varied, the object undergoing the focus detection changes, with the result that an unintended action is induced. On the other hand, if an auto-zoom change switch is separately provided, zoom auto-/manual modes and focus detection area auto/manual modes have to be separately operated. This operation is quite troublesome.

Further, another problem arises. For instance, a focus detection area other than a central area is selected according to a focus detection area auto selection, and the focus is detected. In this case, when the zoom is varied, the object undergoing the focus detection changes, with the result that an unintended photo is taken. In the worst case, the auto focus detection area selection and the auto-zoom act on each other. Consequently, hunting occurs, or the object is out of a focus detection frame, resulting in a focus undetectable state in some cases.

SUMMARY OF THE INVENTION

One aspect of the invention is to provide an auto-zoom camera capable of preventing an auto-zoom operation contrary to an intention of a photographer by automatically inhibiting the auto-zoom in accordance with a focus detection area to be selected or effecting a changeover to a manual zoom.

Another aspect of the invention is to provide an auto-zoom camera capable of preventing an auto-zoom operation contrary to the intention of the photographer when a focus detection area other than a central focus detection area is selected or when a focus is undetectable in the central focus detection area.

Another aspect of the application is provide a camera including: a first selecting element for causing the camera to automatically select at least one focus detection area from a plurality of focus detection areas; a second selecting element for causing a photographer to select at least one focus detection area from the plurality of focus detection areas; a mode switching element for switching over a first photographing mode for effecting photography on the basis of the focus detection area selected by the first selecting element and a second photographing mode for effecting the photography on the basis of the focus detection area selected by the second selecting element; and a zoom inhibiting element for inhibiting operation of an auto-zoom driving element when the mode switching element sets the second photographing mode.

Another aspect of the invention is to provide a camera including: a first selecting element for causing the camera to automatically select at least one focus detection area from a plurality of focus detection areas; a second selecting element for causing a photographer to select at least one focus detection area from the plurality of focus detection areas; and a zoom inhibiting element for inhibiting operation of an auto-zoom driving element when the second selecting element selects a focus detection area other than a central focus detection area. When the auto-zoom is performed in the case of a focus detection area auto selection and when the central focus detection area is selected based on a focus detection area manual selection. The auto-zoom is inhibited when the focus detection area other than the central focus detection area is selected based on the focus detection area manual selection.

Another aspect of the invention is to provide a camera including: a first selecting element for causing the camera to automatically select at least one focus detection area from the plurality of focus detection areas; a second selecting element for causing a photographer to select at least one focus detection area from the plurality of focus detection areas; a mode switching element for switching over a first photographing mode for effecting photography on the basis of the focus detection area selected by the first selecting element and a second photographing mode for effecting photography on the basis of the focus detection area selected by the second selecting element; a focus driving element for making a focus adjustment by driving a photographing lens in accordance with a defocus quantity of the selected focus detection area; a focal length calculating element for calculating an optimum focal length of the photographing lens; an outside operating element for giving an indication to change the focal length; a zoom driving element for automatically driving the photographing lens to a focal length position obtained by the focal length calculating element or a focal length position indicated by the outside operating element; and a control element for permitting the outside operating element to change the focal length but inhibiting an operation of the focal length calculating element when the mode switching element sets the second photographing mode.

The auto-zoom is conducted in the case of a focus detection area auto selection. In the case of a focus detection area manual selection, a zoom mode is set to a so-called manual mode for performing zooming to the focal length position indicated by the outside operating element.

Another aspect of the invention is to provide a camera including: a first selecting element for causing the camera to automatically select at least one focus detection area from a plurality of focus detection areas; a second selecting element for causing a photographer to select at least one focus detection area from the plurality of focus detection areas; a focus driving element for making a focus adjustment by driving a photographing lens in accordance with a defocus quantity of the selected focus detection area; a focal length calculating element for calculating an optimum focal length of the photographing lens; an outside operating element for giving an indication to change the focal length; a zoom driving element for automatically driving the photographing lens to a focal length position obtained by the focal length calculating element or a focal length position indicated by the outside operating element; and a control element for permitting the outside operating element to change the focal length but inhibiting an operation of the focal length calculating element when the second selecting element selects the focus detection area other than the central focus detection area.

The auto-zoom is performed in the case of the focus detection area auto selection and when the central focus detection area is selected based on the focus detection area manual selection. The zoom mode is set to the manual mode when the focus detection area other than the central focus detection area is selected based on the focus detection area manual selection.

Another aspect of the invention is to provide a camera including: a focus driving element for making a focus adjustment by driving a photographing lens in accordance with a detected defocus quantity; an object distance calculating element for calculating a distance to an object; a focal length calculating element for calculating an optimum focal length of the lens from the distance of the object in the central part by obtaining a distance to a central object through the object distance calculating element after the defocus detecting element has detected a defocus of the central part; a zoom driving element for automatically driving the photographing lens to a focal length position obtained by the focal length calculating element.

During the auto-zoom, the focus detection is automatically performed in the central focus detection area.

Another aspect of the invention is to provide a camera including: a selecting element for selecting at least one focus detection area from a plurality of focus detection areas; a focus driving element for making a focus adjustment by driving a photographing lens in accordance with a defocus quantity of the focus detection area selected by the selecting element; an object distance calculating element for calculating a distance to an object; a focal length calculating element for calculating an optimum focal length of the lens; a zoom driving element for automatically driving the photographing lens to a focal length position obtained by the focal length calculating element; and a zoom inhibiting element for inhibiting a zoom drive when the focus detection area selected by the selecting element is not a central focus detection area.

Another aspect of the invention is to provide a camera including: a selecting element for automatically selecting at least one focus detection area from a plurality of focus detection areas; a focus driving element for making a focus adjustment by driving a photographing lens in accordance with a defocus quantity of the focus detection area selected by the selecting element; an object distance calculating element for calculating a distance to an object; a focal length calculating element for calculating an optimum focal length of the lens; a zoom driving element for automatically driving the photographing lens to a focal length position obtained by the focal length calculating element; and a zoom inhibiting element for inhibiting a zoom drive in a case where a difference between an object distance in a central focus detection area and an object distance in a focus detection area other than the central focus detection area is, when comparing these object distances, a predetermined value or larger if the focus detection area selected by the selecting element is not the central focus detection area.

Another aspect of the invention is to provide a camera including: a selecting element for selecting at least one focus detection area from a plurality of focus detection areas; a focus driving element for making a focus adjustment by driving a photographing lens in accordance with a defocus quantity of the focus detection area selected by the selecting element; an object distance calculating element for calculating a distance to an object; a focal length calculating element for calculating an optimum focal length of the lens; a zoom driving element for automatically driving the photographing lens to a focal length position obtained by the focal length calculating element; and a zoom inhibiting element for inhibiting a zoom drive in a case where a difference between a defocus quantity of a central focus detection area and a defocus quantity of a focus detection area other than the central focus detection area is, when comparing these defocus quantities, a predetermined value or larger if the focus detection area selected by the selecting element is not the central focus detection area.

The selecting element selects the focus detection area other than the central focus detection area. In this case, if a difference in the object distance between the central focus detection area and the peripheral focus detection area or a difference in the defocus quantity therebetween is, when compared, large, the auto-zoom is not executed.

Another aspect of the invention is to provide a camera including: a selecting element for automatically selecting at least one focus detection area from a plurality of focus detection areas; a focus driving element for making a focus adjustment by driving a photographing lens in accordance with a defocus quantity of the focus detection area selected by the selecting element; an object distance calculating element for calculating a distance to an object; a focal length calculating element for calculating an optimum focal length of the lens; a focal length detecting element for detecting a present focal length of the lens; a focal length re-calculating element for newly calculating a focal length from the focal length calculated by the focal length calculating element and the focal length detected by the focal length detecting element; and a zoom driving element for driving the photographing lens to a focal length position obtained by the focal length calculating element when the focus detection area selected by the selecting element is a central focus detection area and driving the photographing lens to a focal length position obtained by the focal length re-calculating element when the focus detection area is an area other than the central focus detection area.

The focal length re-calculating element applies a restriction to the zoom when the selecting element selects the focus detection area other than the central focus detection area, thereby performing the auto-zoom.

Another aspect of the invention is to provide a camera including: a selecting element for selecting at least one focus detection area from a plurality of focus detection areas; a focus driving element for making a focus adjustment by driving a photographing lens in accordance with a defocus quantity of the focus detection area selected by the selecting element; an object distance calculating element for calculating a distance to an object; a focal length calculating element for calculating an optimum focal length of the lens; a zoom driving element for automatically driving the photographing lens to a focal length position obtained by the focal length calculating element; and a zoom inhibiting element for inhibiting a zoom drive when a central focus detection area is focus-undetectable.

If the central focus detection area is focus-undetectable, the auto-zoom is not carried out.

Other objects of the present invention will become apparent from embodiments which will be discussed in conjunction with the accompanying drawings.

BRIEF DESCRIPTION OF THE DRAWINGS

FIG. 7 is a view showing display examples of an in-finder display unit and the outer liquid crystal display panel when designating a focus detection area in the first embodiment of this invention;

FIG. 11 is a flowchart showing an operation of the [focus detection & zoom adjustment] in a second embodiment of this invention;

DETAILED DESCRIPTION OF THE PREFERRED EMBODIMENTS

The present invention will hereinafter be described in detail based on illustrative embodiments.

Figure 1:
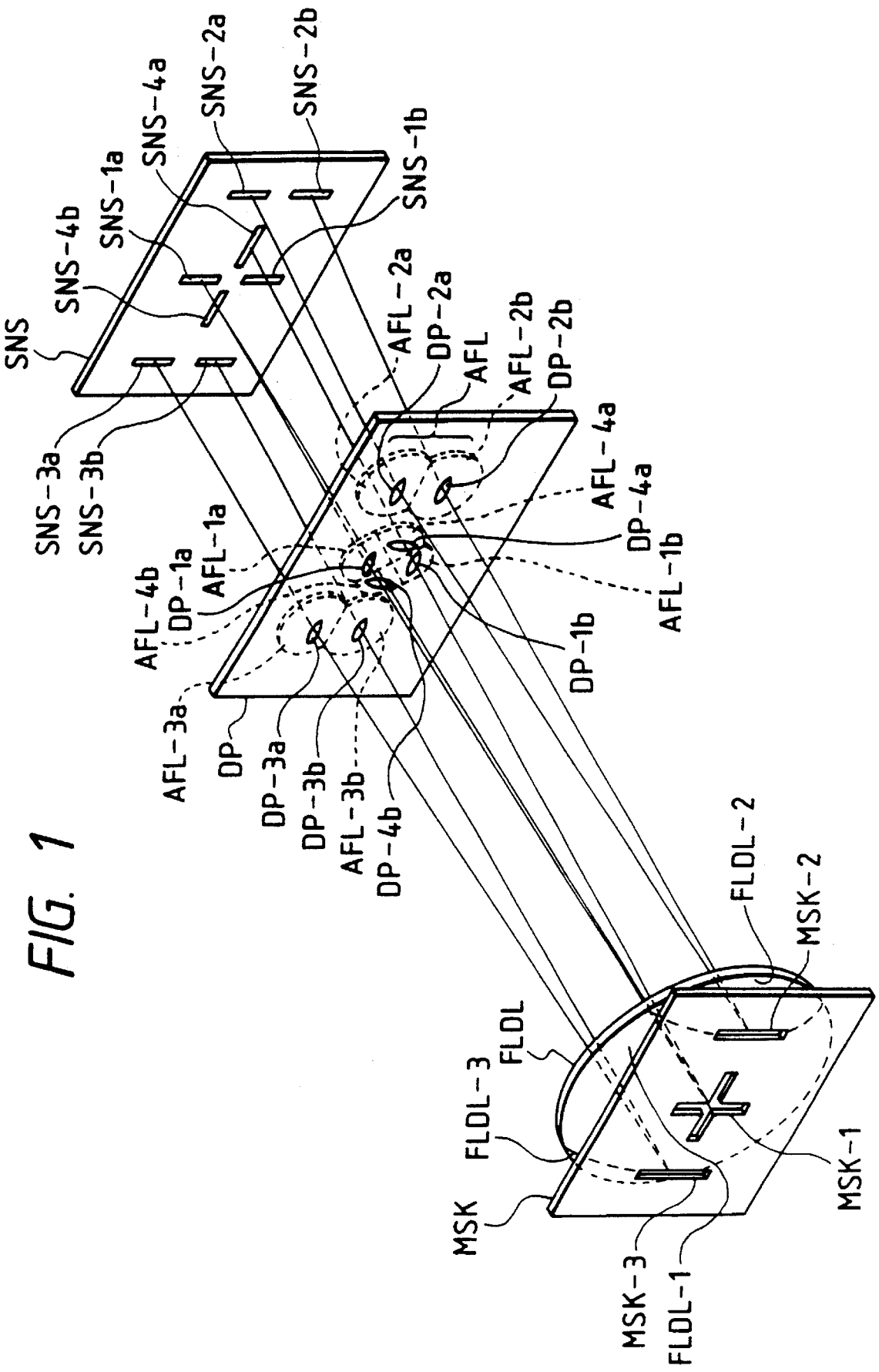
FIG. 1 is a perspective view illustrating a focal detection optical system of an auto-zoom camera in a first embodiment of the present invention.

FIG. 1 is a perspective view illustrating a construction of a focus detection optical system of an auto-zoom camera in a first embodiment of the present invention.

Referring to FIG. 1, a field mask MSK is formed with a cross opening MSK-1 at its central part and vertically elongate openings MSK-2, MSK-3 at the peripheral parts on both sides. A field lens FLDL consists of three segments FLDL-1, FLDL-2, FLDL-3 corresponding to the three openings MSK-1, MSK-2, MSK-3 of the field mask.

A diaphragm DP is formed with four openings DP-1a, DP-1b and DP-4a, DP-4b arranged in up-and-down and right-and-left parts of the center of diaphragm DP. The diaphragm DP is also formed with a pair of openings DP-2a, DP-2b and a pair of openings DP-3a, DP-3b in right-and-left peripheral parts. The respective areas FLDL-1, FLDL-2, FLDL-3 of the field lens FLDL act to form images of these opening pairs DP-1, DP-2, DP-3 in the vicinity of exit pupil of an unillustrated objective lens.

Secondary imaging lens AFL is constructed of four couples, that is, a total of eight pieces of lenses AFL-1a, AFL-1b, AFL-4a, AFL-4b, AFL-2a, AFL-2b, AFL-3a, AFL-3b. The secondary imaging lens AFL is disposed corresponding to and in rear of the openings of the diaphragm DP.

A focus detection sensor device SNS consists of four couples, that is, a total of eight sensor strings, SNS-1a, SNS-1b, SNS-4a, SNS-4b, SNS-2a, SNS-2b, SNS-3a, SNS-3b. The sensor strings are disposed corresponding to the respective secondary imaging lenses AFL to receive the images thereof.

In the focus detection optical system shown in FIG. 1, if a focal point of the photographing lens exists in front of the film surface, the object images formed on the respective sensor string couples get close to each other. Whereas if the focal points exists in rear thereof, the object images move away from each other. A relative position shift quantity has a specific functional relationship with the out-of-focus quantity of the photographing lens. Hence, proper calculations are effected on the sensor outputs through the respective sensor string couples. It is thus possible to detect the out-of-focus quantity, so-called a defocus quantity of the photographing lens.

Taking the construction described above, it is possible to detect the focus even of objects existing in positions corresponding to the field mask peripheral openings MSK-2, MSK-3 in the vicinity of and off the center of the range photographed or viewed through the photographing lens (objective lens) LNS which will be mentioned later.

Figures 1, 7A:
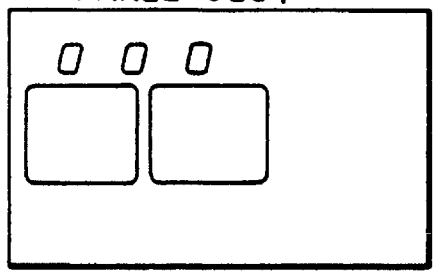
Figures 2, 7A:
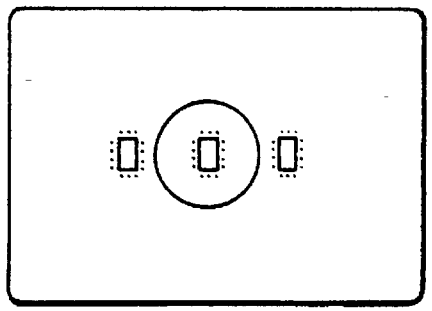
FIG. 2 is a side view showing a state where the focus detection optical system is incorporated into the camera.
Figures 1, 7B:
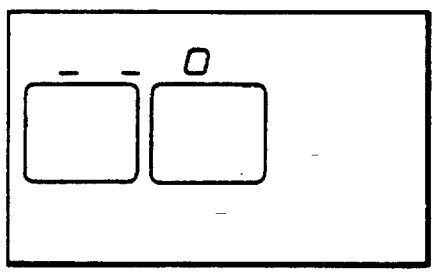
Figures 2, 7B:
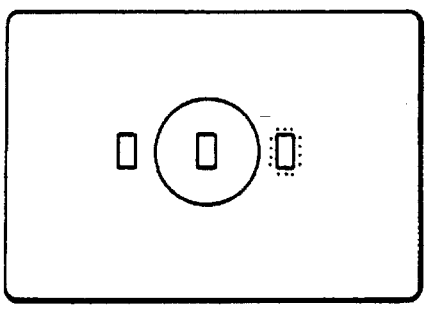
Figures 1, 7C:
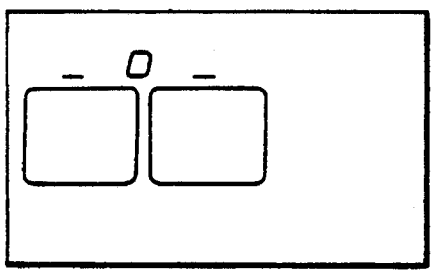
Figures 2, 7C:
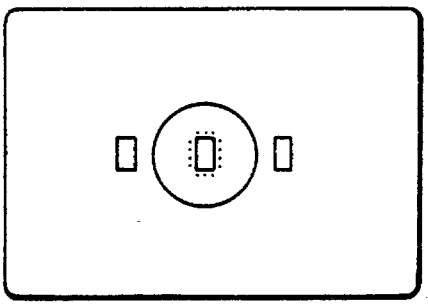
Figures 1, 7D:
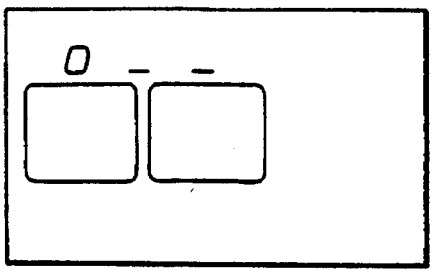
Figures 2, 7D:
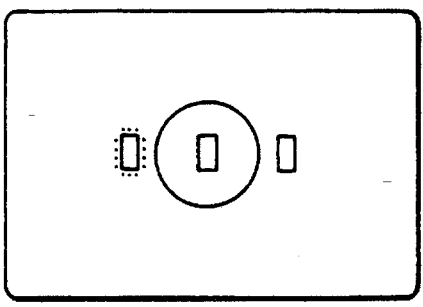

FIG. 2 is a view showing an optical layout when a focus detecting device having the above focus detection optical system is incorporated into the camera.

Figure 4:
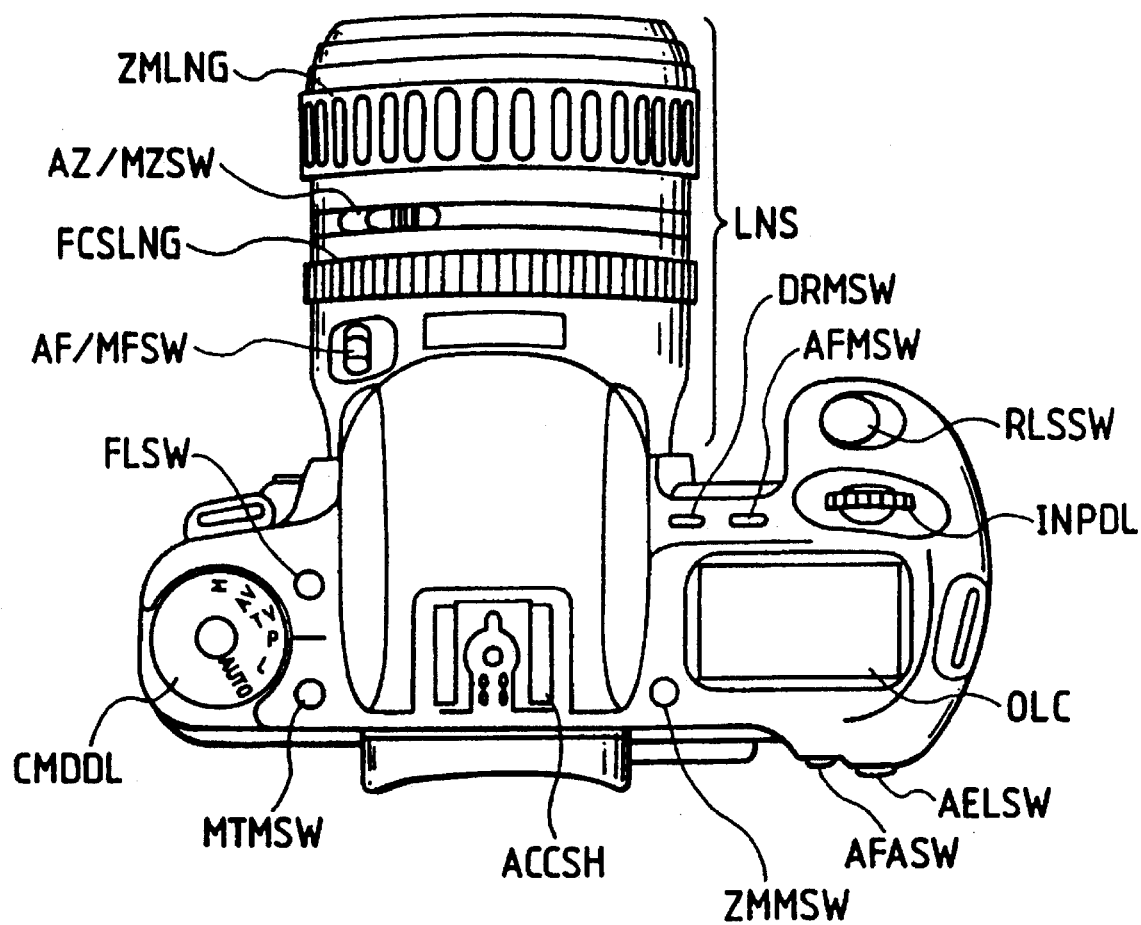
FIG. 4 is a top view of the auto-zoom camera in the first embodiment of this invention.

Shown in FIG. 4 are the photographing lens LNS, a quick return mirror QRM, a focusing screen FSCRN, a pentaprism PP, an eyepiece EPL, a film surface EPLN, a submirror SM, a field mask MSK, an infrared cut filter, a field lens FLD, first and second reflecting mirrors RM1, RM2, a light-shielding mask SHMSK, a diaphragm DP, a secondary imaging lens AFL, a reflecting mirror AFM and the above-mentioned focus detection sensor device SNS.

Figure 3B:
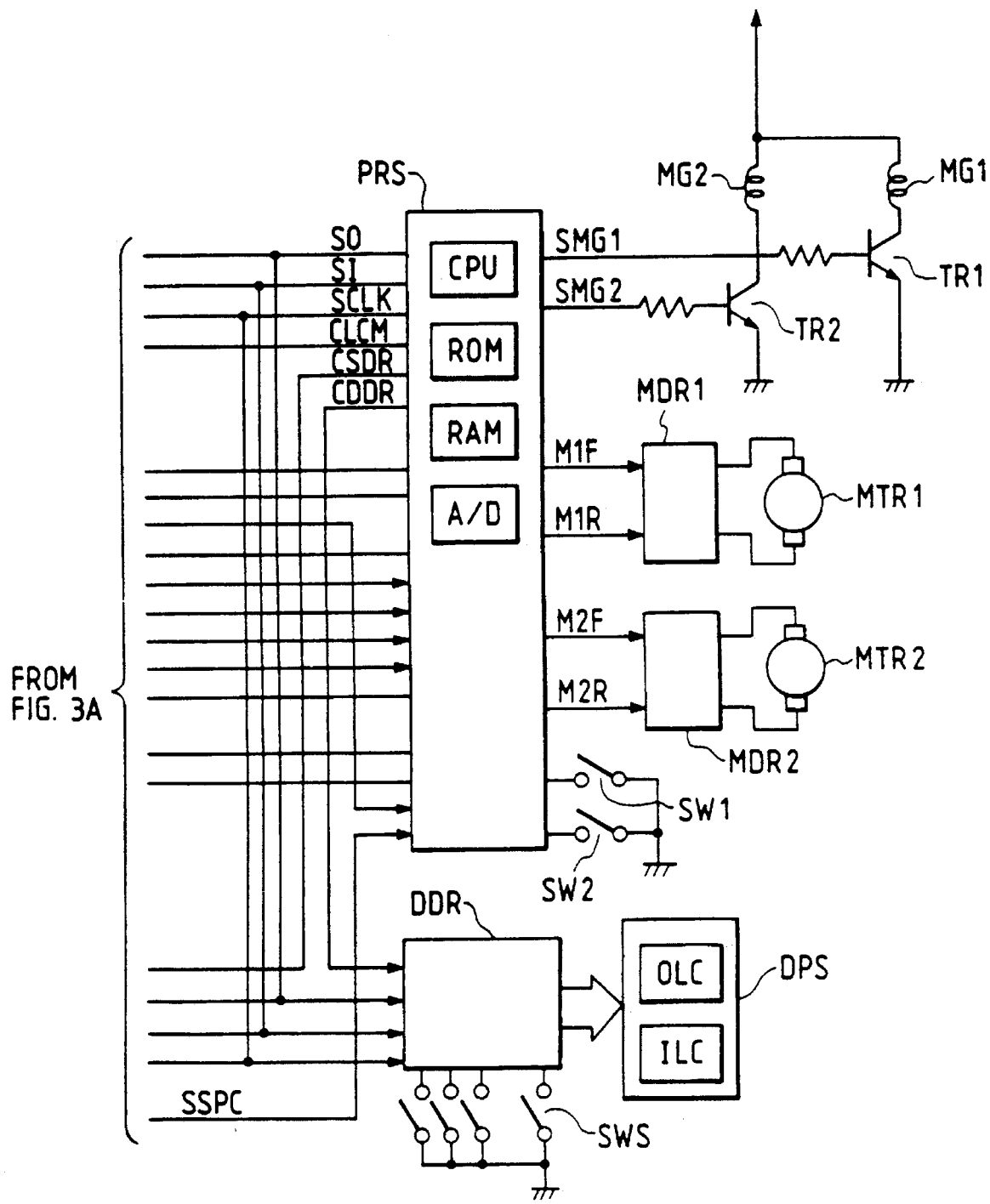
FIG. 3, which consists of FIGS. 3A and 3B, is a circuit block diagram showing a construction of the auto-zoom camera in the first embodiment of this invention.

FIGS. 3A and 3B are circuit diagrams showing one example of a concrete construction of the camera including the focus detecting device illustrated in FIGS. 1 and 2.

In FIGS. 3A and 3B, a camera control device PRS is a one-chip microcomputer internally including, e.g., a CPU (central processing unit), a ROM, a RAM and A/D converting function. The microcomputer PRS performs a series of camera actions such as an auto-exposure control function, an auto-focus adjusting function and film winding/rewinding in accordance with a camera sequence program stored in the ROM. For this reason, the microcomputer PRS effects communications with an in-lens control device and with peripheral circuits in the camera body and controls the operations of the respective circuits and the lens by use of communications signals SO, SI, SCLK and communications selecting signals CLCM, CSDR, CDDR.

A data signal SO is outputted from the microcomputer PRS. A data signal SI is inputted to the microcomputer PRS. Synchronous clocks SCLK are of the signals SO, SI.

A lens communications buffer circuit LCM supplies, when the camera is active, a lens power source terminal VL with electric power. The lens communications buffer circuit LCM at the same time turns out a camera-to-lens communications buffer when the selecting signal CLCM from the microcomputer PRS assumes a high potential level (hereinafter shortly termed "H", while a low potential level is termed "L").

The microcomputer PRS sets the selecting signal CLCM at "H" and transmits a predetermined item of data in the form of the signal SO in synchronism with SCLK. Then, the buffer circuit LCM outputs the respective buffer signals LCK, DCL of SCLK, and SO via the camera-to-lens communications contact. Simultaneously, the buffer signal of the signal DCL from the photographing lens LNS is outputted as the signal SI. The microcomputer PRS inputs the signal SI as a piece of lens data in synchronism with SCLK.

A switch detection/display circuit DDR is, when the signal CDDR is at "H", selected and controlled by the microcomputer PRS by using SO, SI, SCLK. More specifically, an indication on a camera display member DPS (consisting of an outer display element OLC and an in-finder display element ILC) is changed over based on the data transmitted from the microcomputer PRS; or alternatively the microcomputer PRS is informed of ON/OFF states of a variety of manipulation members of the camera.

Figure 9:
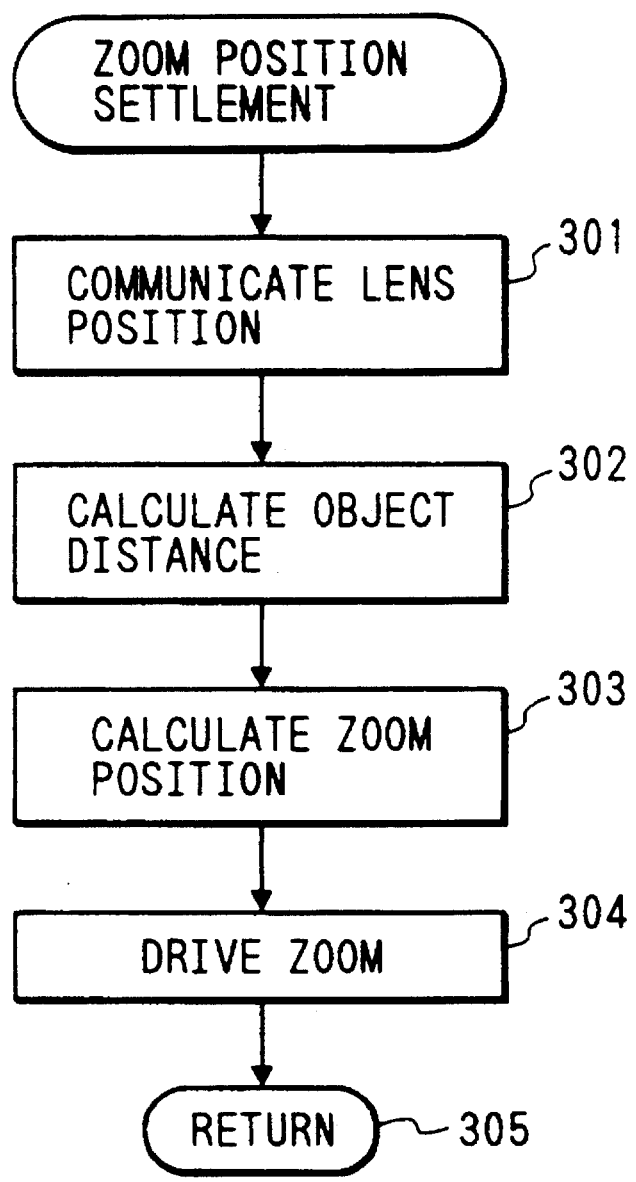
FIG. 9 is a flowchart showing an operation of a [zoom position settlement]

Switches SW1, SW2 are interlocked with a release button RLSSW (which will be fully mentioned in FIG. 9). The switch S1 is turned ON by depressing the release button at a first stage, and subsequently, with a depression at a second stage, the switch SW2 is turned ON. The microcomputer PRS performs the photomerry and autofocus adjustment when the switch SW1 is turned ON. The microcomputer PRS controls the exposure with the turn-ON of the switch SW2 serving as a trigger and thereafter winds a film.

Note that the switch SW2 is connected to an [interrupt input terminal] of the microcomputer PRS. An interrupt is applied due to the turn-ON of the switch SW2 even during an execution of the program in an ON-time of the switch SW1, thereby enabling the control to shift to a predetermined interrupt program.

A motor MTR1 feeds the film. A motor MTR2 serves for mirror-up/mirror-down and a shutter spring charge. Forward and reverse rotations of the motors are controlled by respective drive circuits MDR1, MDR2. Signals M1F, M1R, M2F, M2R inputted from the microcomputer PRS to MDR1, MDR2 are motor control signals.

Magnets MG1, MG2 are used for starting tripping of shutter leading/trailing curtains. The magnets MG1, MG2 are energized by signals SMG1, SMG2 and amplifier transistors TR1, TR2. The shutter is controlled by the microcomputer PRS.

Note that the switch detection/display circuit DDR, the motor drive circuits MDR1, MDR2 and the shutter control are not directly associated with the present invention, and hence their detailed explanations will be omitted.

The symbol LPRS represents an in-lens control circuit. A signal DCL inputted to the circuit LPRS in synchronism with LCK is defined as data of an instruction from the camera to the photographing lens LNS. A lens operation to the instruction is predetermined. The control circuit LPRS analyzes the instructions in accordance with predetermined procedures. The control circuit LPRS makes a focal adjustment and controls a diaphragm. The control circuit LPRS also outputs operating conditions (a drive condition of the focal adjustment optical system and a drive condition of the diaphragm) of respective elements of the lens and a variety of parameters (an aperture F-number, a focal length, a coefficient of defocus quantity versus focal adjustment optical system moving quantity, etc.) from an output DLC.

This embodiment Gives an example of a zoom lens. When the camera issues an instruction of the focal adjustment, a focal adjustment motor LMTR is driven by signals LMF, LMR in accordance with a driving quantity/direction simultaneously transmitted. The focal adjustment optical system is thereby moved in the optical-axis direction, thus performing the focal adjustment. The moving quantity of the optical system is monitored by a pulse signal SENCF of an encoder circuit ENCF wherein a pattern of a pulse plate rotating in interlock with the optical system is detected by a photo coupler, and a corresponding number of pulses to the moving quantity are outputted. The pulse number is counted by a counter in the circuit LPRS. The circuit LPRS itself sets the signals LMF, LMR at "L" so that the count value coincides with the moving quantity given to the circuit LPRS, thereby controlling the motor LMTR.

For this reason, after the instruction of the focal adjustment has been once issued from the camera, the microcomputer PRS serving as the camera control device is not absolutely required to take part in the drive of the lens until the lens drive is finished. Further, if a request is given from the camera, the arrangement is such that a content of the above counter is transferred to the camera.

When a diaphragm control instruction is issued from the camera, a known stepping motor (unillustrated) for driving the diaphragm is actuated in accordance with an aperture scale number transferred simultaneously. Note that the stepping motor is capable of open control and does not therefore require an encoder for monitoring the operation.

When a zoom drive instruction is issued from the camera, a zoom drive motor ZMTR is actuated by signals ZMFZ, ZMR in accordance with a focal length position transferred simultaneously. A position of a zoom optical system is detected by an absolute position encoder circuit ENCZ concomitant thereto. The control circuit LPRS inputs a signal SENCZ from the encoder circuit ENCZ and detects a zoom position. Just when the zoom position comes to a target position, the circuit LPRS itself sets the signals ZMF, ZMR at "L", thereby controlling the motor ZMTR. For this reason, after the zoom drive instruction has been once given from the camera, the microcomputer PRS serving as the camera control device is not absolutely required to take part in the drive of the zoom lens until the zoom lens drive comes to an end. Further, the encoder circuit ENCZ is also constructed to output the signal when the zoom lens is manually moved. Among lens parameters in respective zoom positions that are stored in the control circuit LPRS, the lens parameter corresponding to the present zoom position is transmitted to the camera if requested by the camera-side microcomputer PRS.

A photometric sensor SPC for controlling an exposure receives the light from the object via the photographing lens. An output SSPC thereof is input to an analog input terminal of the microcomputer PRS and, after A/D conversion is employed for auto exposure control in accordance with a predetermined program.

A drive circuit SDR of a focus detection sensor device SNS is selected when a signal CSDR assumes "H" and controlled from the microcomputer PRS by use of SO, SI, SCLK.

Signals φSEL0, φSEL1 supplied from the drive circuit SDR to the sensor device SNS are just the signals SEL0, SEL1 from the microcomputer PRS. The signals φSEL0, φSEL1 are signal for selecting a sensor string couple SNS-1 (SNS-1a, SNS-1b) when φSEL0="L" and φSEL1="L", a sensor string couple SNS-4 (SNS-4a, SNS-4b) when φSEL0="H" and φSEL1="L", a sensor string couple SNS-2 (SNS-2a, SNS-2b) when φSEL0="L" and φSEL1="H" and a sensor string couple SNS-3 (SNS-3a, SNS-3b) when φSEL0="H" and φSEL1="H", respectively.

After finishing an accumulation, SEL0 and SEL1 are properly set. Then, clocks φSH, φHRS are transmitted, whereby image signals of the sensor string couples selected by SEL0, SEL1 (φSEL0, φSEL1) are serially outputted in sequence from an output VOUT.

Monitor signals VP1, VP2, VP3, VP4 are transmitted respectively from object luminance monitor sensors disposed in the vicinities of the sensor string couples SNS-1 (SNS-1a, SNS-1b), SNS-2 (SNS-2a, SNS-2b), SNS-3 (SNS-3a, SNS-3b), SNS-4 (SNS-4a, SNS-4b). Simultaneously when starting the accumulation, voltages thereof increase, thereby controlling the accumulation of each sensor string.

Signals φRES, φVRS are clocks for resetting the sensors. Clocks φHRS, φSH serve for reading the image signals. Clocks φT1, φT2, φT3, φT4 are intended to finish the accumulations of the respective sensor string couples.

An output VIDEO of the sensor drive circuit SDR is an image signal amplified by a gain determined by the object luminance after taking a difference between the image signal VOUT from the sensor device SNS and a dark current output. The above dark current output is defined as an output value of a light-shielded pixel in the sensor string. The sensor drive circuit SDR holds its output in a capacitor by a signal DSH from the microcomputer PRS and effects a differential amplification between it and the image signal. The outputs VIDEO are inputted to an analog input terminal of the microcomputer PRS. The microcomputer PRS sequentially stores, after the same signals have been A/D converted, digital values thereof in predetermined addresses on the RAM.

Signals /TINTE1, /TINTE2, /TINTE3, /TINTE4 are signals becoming proper with electric charges accumulated respectively in the sensor string couples SNS-1 (SNS-1a, SNS-1b), SNS-2 (SNS-2a, SNS-2b), SNS-3 (SNS-3a, SNS-3b), SNS-4 (SNS-4a, SNS-4b) and indicating an end of the accumulation. The microcomputer PRS receives these signals and executes reading of the image signals.

A signal BTIME gives a timing for determining a read gain of an image signal amplifier in the sensor drive circuit SDR. Normally, the above circuit SDR determines a corresponding sensor string couple from voltages of the monitor signals VP1–VP4 when the signal BRIME assumes "H".

The microcomputer PRS supplies the sensor drive circuit SDR with reference clocks CK1, CK2 in order to generate the above clocks φRES, φVRS, φHRS, φSH.

The microcomputer PRS transmits a predetermined [start-of-accumulation command] to the sensor drive circuit SDR while setting the communications selecting signal CSDR at "H". The sensor device SNS thereby starts the operation of accumulation.

With this operation, the object images formed on the respective sensors are photoelectrically converted by the four sensor string couples. The electric charges are accumulated in the photoelectric converting elements of the sensors. At the same time, the luminance monitor sensor signals VP1–VP4 of the respective sensors increase, and, when the voltages thereof reach a predetermined level, the above signals /TINTE1 to /TINTE4 from the sensor drive circuit SDR independently become "L".

The microcomputer PRS, on receiving this, outputs a predetermined waveform to the clock CK2. The sensor drive circuit SDR generates the clocks φSH, φHRS on the basis of CK2 and supplies these clocks to the sensor device SNS. The sensor device SNS outputs the image signals in response to the clocks. The microcomputer PRS A/D converts the outputs VIDEO inputted to the analog input terminal by use of the internal A/D converting function in synchronism with CK2 outputted by the microcomputer PRS itself. Thereafter, the microcomputer PRS sequentially stores the results as digital signals in predetermined addresses of the RAM.

In the manner described above, the microcomputer PRS receives the image information of the object image formed on each sensor string couple and, thereafter, performs a predetermined calculation of the focus detection. An out-of-focus quantity of the photographing lens LNS can be thus determined.

Next, a variety of operation members incorporated into the camera will be explained with reference to a top view of FIG. 4 of the camera.

In FIG. 4, the symbol LNS represents the abovementioned photographing lens. In this embodiment, there is shown an example of a zoom lens.

When a zoom switch AZ/MZSW is set in a manual zoom mode, a zoom ring ZMLNG is operated irrespective of the zoom mode on the side of the camera. A focal length of the photographing lens can be thereby manually varied. When the zoom switch AZ/MZSW is set in the auto-zoom, and if the zoom mode of the camera is an auto mode, the focal length can not be varied even by rotating this zoom ring ZMLNG.

A manual focus adjusting member FCSLNG is, when an auto/manual focus adjusting switch AF/MF SW is set in a manual mode, capable of manually adjusting the focal point.

The symbol FLSW designates an ON/OFF button of a built-in electronic flash. Use/non-use states of the built-in flash are changed over each time the switch is depressed once.

A photographing mode setting dial CMDDL is a dial switch for setting photographing modes such as a manual exposure mode, a shutter priority AE mode, an aperture priority AE mode, a program AE mode, a camera photographing mode, a full auto mode (green), a picture select mode (the picture select mode includes a sports mode, a close-up mode, a scene mode and a portrait mode according to situations of the photography). In addition, the photographing mode setting dial CMDDL sets camera photographing modes and a setting mode and also changes over a power switch such as to set an ISO sensitivity, multiple exposures, AEB (Auto Exposure Bracketing), a custom function setting mode and operate a lock switch for the whole camera.

Each time a zoom mode switching button ZMMSW is depressed once, the zoom mode is switched over to an auto zoom mode in which the camera automatically sets a zoom position and a manual zoom mode in which the photographer adjusts the zoom position.

When depressing a focus detection area setting mode button AFASW, the mode turns out a focus detection area setting mode. A dial input member INPDL (which will be stated later) is rotated, thereby the focus detection area is changed over in the following sequence: [Right Focus Detection Area]→[Central Focus Detection Area]→[Left-Focus Detection Area]→[Focus Detection Area Auto Selection]→[Right Focus Detection Area]. When the dial input member INPDL is rotated in the opposite direction, the focus detection area is changed over in the reverse sequence. The focus detection area setting mode is ended by half-depressing a release button RLSSW (which will hereinafter be mentioned) or depressing the focus detection area setting mode button AFASW once again.

The photography is controlled based on a photometric value when depressing an AEW lock button AELSW.

Figure 5:
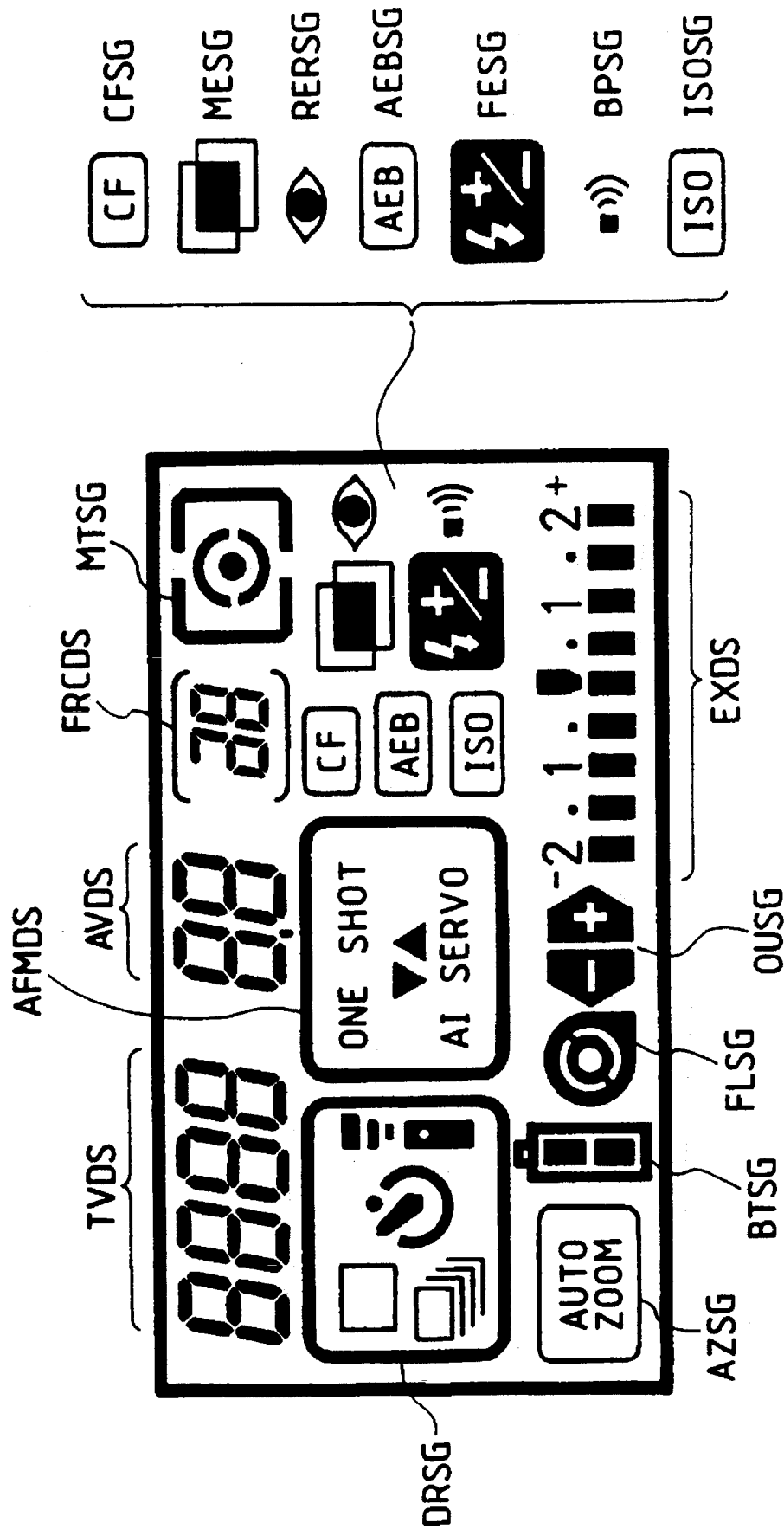
FIG. 5 is an explanatory view showing respective display elements on an outer liquid crystal display panel.

A shutter speed, an f-number, a film shot number, etc. are displayed on an outer liquid crystal display panel OLC (which will be explained in detail in FIG. 5).

The dial type input member INPDL is defined as a general-purpose input member for setting various items such as a shutter speed in the shutter priority AE mode, an f-number in the aperture priority AE mode, etc. according to a variety of modes.

The switch SW1 is turned ON with a depression of the release button RLSSW at the first stage, and subsequently, the switch SW2 is turned ON with the depression at the second stage.

An AF mode switching button AFMSW switches over the mode to a one-shot mode (suited to take a shot of a still object) in which the lens is not driven after one focus detection has been finished and a servo mode (suited to take a shot of a moving object) in which the lens is made to follow up motions of the object while repeating the focus detection all the time.

Every time a film feed mode switching button DRMSW is depressed, a film feed mode is switched over such as: [One-Frame Shot]→[Continuous Shots]→[Self/Remote Control Shots]→[One-Frame Shot].

Next, respective display elements of the liquid crystal display panel OCL of FIG. 4 will be explained in detail with reference to FIG. 5.

A display element TVDS displays an ISO film sensitivity and a custom function Number other than set/calculated values of the shutter speed.

A display element AVDS displays an ABE step value and a custom function set display other than aperture set/calculated values.

Note that the focus detection area is displayed by use of the above display elements TVDS, AVDS when in a focus detection area setting mode.

An AF mode display element AFMDS displays letters of [ONE SHOT] when the AF mode is a one-shot mode but displays letters of [AI SERVO] when in an AI servo mode. Both of the displays are given in the case of one-shot/servo auto switching.

A display element FRCD displays a film frame number, a multiple exposure set frame number or a multiple exposure shot number.

A photometric display element MTSG displays an outer frame, a mid-split ring part and an entire central point part in the case of an evaluation photometry and displays the outer frame and the ring part in the case of a partial photometry. Only the outer frame is displayed in the case of an average photometry.

A display element CFSG is flashed when the custom function is set. A multiple exposure display element MESG is flashed when the multiple exposure is set. A red-eye relief display element RERSG is flashed when a red-eye relief function is set. An AEB display element AEBSG is flashed when AEB is set. A built-in flash dimming correction display element FESG is flashed when a dimming correction of the built-in flash is set. A focalized sound display element BPSG is flashed when set to give a focalized sound. A film sensitivity display element ISOSG is flashed when the film sensitivity is displayed on the display element TVDS.

An exposure display element EXDS displays an exposure correction when taking an AE shot, an exposure deviation quantity when AEB is set, and a flash dimming correction quantity. A manual exposure level display element OUSG displays [+] if there is overexposure in the manual mode but displays [−] if there is underexposure.

A film condition display element FLSG displays indications of a film loaded/unloaded confirmation, a film rewind completion and an auto-loading failure by lighting up or flashing them.

The photometric display element MTSG displays the outer frame, the mid-split ring part and the entire central point part in the case of the evaluation photometry and displays the outer frame and the ring part in the case of the partial photomerry. Further, only the outer frame is displayed in the case of an average photometry.

A battery check display element BTSG displays a residual quantity of the battery. A film feed mode display element DRSG displays the one-frame shot or the continuous shots or the self/remote control shot in the film feed mode. An auto-zoom mode display element AZSG displays an auto-zoom mode.

Figure 6:
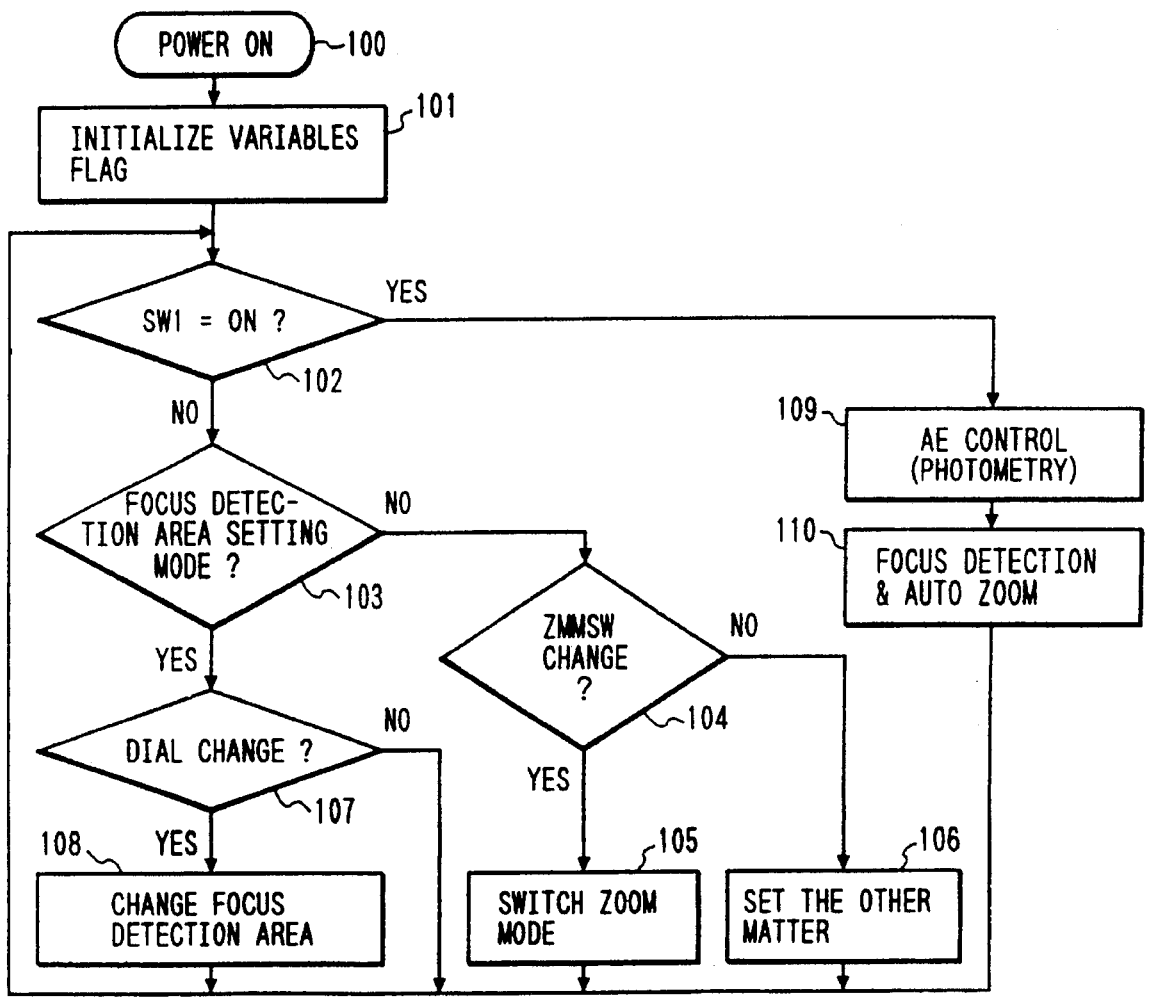
FIG. 6 is a flowchart showing a main operation of the auto-zoom camera in the first embodiment of this invention.

Next, a main operation of the thus constructed camera will be explained with reference to a flowchart of FIG. 6.

When switching ON the power supply, the microcomputer PRS starts performing actions from step (101) through step (100).

In step (101), variables, flags and the line are initialized, and the action proceeds to step (102).

In step (102), a state of the switch SW1 turned ON by depressing the release button RLSSW at the first stage is detected. If in an OFF-state, the action shifts-to step (103). Whereas if in an ON-state, the action proceeds to step (109).

In the step (103), though brought into the focus detection area setting mode with a depression of the focus detection area setting button AFASW shown in FIG. 4, whether or not the present camera status is in this focus detection area setting mode is checked. If in the focus detection area setting mode, the action goes to step (107). Whereas if not, the action proceeds to step (104).

Whether a change in the dial input member INPDL is made or not is checked in step (107). If no dial change is made, the action returns to step (102) without changing the focus detection area. If there is a dial change, the action goes to step (108).

In step (108), the focus detection area is changed in accordance with a changing direction of the dial input member INPDL, and the action goes back to step 102.

Herein, a way of setting the focus detection area will be described referring to FIG. 7.

FIG. 7 shows displays when in the focus detection area setting mode. Displays (a. 1), (b. 1), (c. 1) (d. 1) are shown on the outer liquid crystal display panel OLC. Displays (a. 2), (b. 2), (c. 2), (d. 2) are shown on the in-finder display element ILC.

For example, it is now assumed that the focus detection area auto selection mode is set. In this case, (a. 1) is displayed on the outer liquid crystal display panel OLC, while (a. 2) is displayed on the infinder display element ILC. In this state, when one click rotation of the dial input member INPDL is made counterclockwise, the focus detection area turns out the right focus detection area. At this time, (b. 1), (b. 2) are displayed. When further making the one click rotation thereof, the area turns out the central focus detection area. At this time, (c. 1), (c. 2) are displayed.

In this way, when the dial input member INPDL makes the one click rotation counterclockwise, the focus detection area is switched over in the following sequence: [Auto (a)]→[Right Focus Detection Area (b)]→[Central Focus Detection Area (c)]→[Left Focus Detection Area (d)]→ [Auto (a)]. Further, when the dial input member INPDL is rotated clockwise, the focus detection area is switched over in the sequence reverse to this.

Referring back again to FIG. 6, the explanation will continue.

If determined not to be the focus detection area setting mode in step (103), as explained above, the action shifts to step (104).

In step (104), whether or not the zoom mode change button ZMMSW is depressed is determined. If depressed, the action shifts to step (105). Where as if not, the action shifts to step (106).

In step (105), the zoom mode is switched over. More specifically, when in the auto-zoom mode, this is switched over to the manual zoom mode. When in the manual zoom mode, this is switched over to the auto-zoom mode. If the zoom switch AZ/MZSW of the lens is set to the manual mode, the mode can not turn out the auto-zoom mode.

Effected in step (106) is the setting other than the switch-overs of the focus detection area and of the zoom mode. The particulars are not directly associated with the present invention and therefore omitted.

When determining that the switch SW1 is turned ON in step (102), as described above, the action shifts to step (109).

In step (109), an [AE control] subroutine of the photometry, the camera status display, etc. is executed. Then, when finishing this [AE control] subroutine, the action proceeds to step (110).

In step (110), a [focus detection & auto-zoom] subroutine which will be mentioned later is executed. This subroutine is repeatedly executed for a duration of ON-state of the switch SW1 until a predetermined status is reached.

When finishing the actions of above steps (105), (106), (108), (110), the action goes back to step (102) in any case, wherein the camera operations are repeatedly performed.

Note that the release action is, though the flowchart in this embodiment does not touch on this action, executed in an interrupt routine. This is not, however, directly associated with the present invention and is therefore positively omitted.

Next, the [focus detection & auto-zoom] subroutine executed in step (110) will be explained referring to a flowchart of FIG. 8.

Whether the focusing is a manual focus or not is checked in step (201). In the case of the manual focus, the action shifts to step (211). In this instance, this subroutine is ended without performing the auto focus detection and the auto-zoom as well. Further, if not the manual focus, the action shifts to step (202).

In step (202), whether the focus detection area mode is an auto mode or not is determined. If it is the focus detection area auto selection mode, the action shifts to step (205). When the focus detection area is designated, the action shifts to step (203).

In step (203), the focus detection is conducted in the designated focus detection area, and, thereafter, the action proceeds to step (204).

The auto-zoom is inhibited in step (204). Simultaneously, the indication on the auto-zoom display element AZSG of the outer liquid crystal display panel OLC ceases. Then, the action proceeds to step (211), wherein this [focus detection & auto-zoom] subroutine is returned.

When determined to be the focus detection area auto selection mode in above step (204), as explained earlier, the action shifts to step (205).

In step (205), whether the zoom mode is the auto-zoom mode or not is determined. If the mode is the auto-zoom mode, the action shifts to step (206). Whereas if not, the action shifts to step (209).

Whether or not a zoom position has already been settled is determined in step (206). If settled, the action shifts to step (209). Whereas if unsettled, the action shifts to step (207).

In step (207), the focus detection is carried out in the central focus detection area. The focus detection conducted herein is intended to determine the zoom. The zoom position is settled based on a result of this focus detection. The reason why the central focus detection area is employed is that the object undergoing the focus detection does not change even with a variation in zooming. When finishing this focus detection, the action proceeds to step (208).

In step (208), the zoom position based on the result of the focus detection obtained in above step (207) is settled. That is, a [zoom position settlement] subroutine is executed. Then, after settling the zoom position, the action proceeds to step (211), wherein this [focus detection & auto-zoom] subroutine is returned (ended).

The focus detection is performed in each focus detection area in step (209). This step is executed if the auto-zoom mode is not selected, and after the zoom position has been settled in the auto-zoom. Hence, the object undergoing the focus detection does not change due to the variation in the zoom even by effecting the focus detection in the peripheral focus detection area. Thereafter, the action proceeds to step (210).

In step (210), the focus detection area is selected. The action in this step is to determine which object to focus among eventually three existing focus detection areas. For instance, an area in which a focus of the closest object is detected is selected from the respective areas. Thereafter, the action proceeds to step (211), wherein this [focus detection & auto-zoom] subroutine is returned.

Next, the [zoom position settlement] subroutine in step (208) of FIG. 8 will be explained.

In step (301), information on a lens position is received from the lens (photographing lens LNS) through communications. The information on an absolute distance up to the object is stored as the above lens position information on the lens side. Communicated is a piece of present lens position information, i.e., a piece of object distance information presently set in the lens. Next, the action proceeds to step (302).

Figure 8:
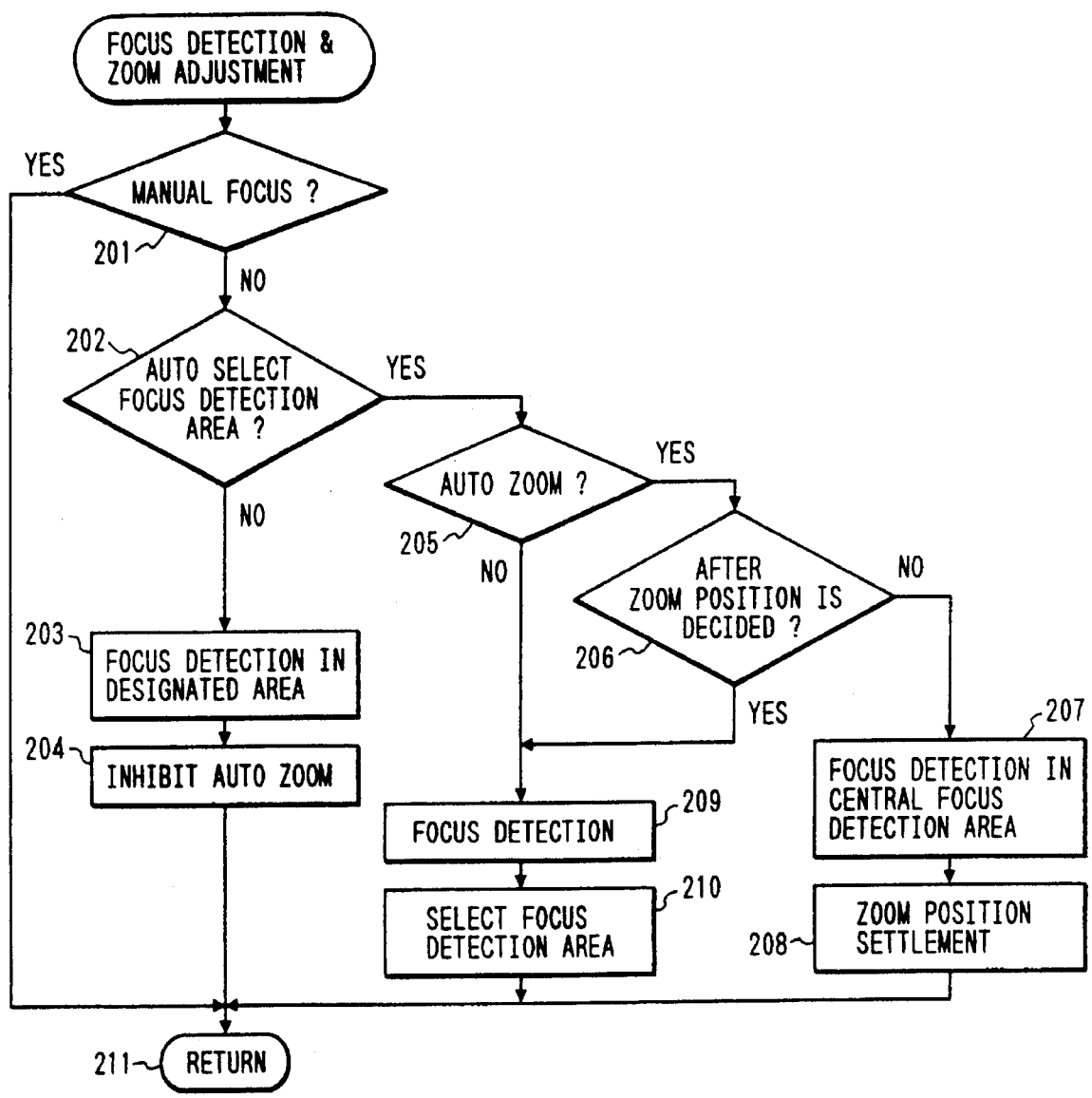
FIG. 8 is a flowchart showing an operation of a [focus detection & zoom adjustment] of FIG. 6.

A distance of the object existing in the central position is calculated in step (302) from a defocus quantity of the central focus detection area that is obtained in step (207) of FIG. 8 and from the lens position obtained in above step (301). The distance OBJ to the object is given by:

$$\beta = \psi(x - def)$$

$$OBJ = (1/\psi\beta) - (1/\psi) - \{1/\psi \cdot (1 - \beta)\}$$

however, $\psi = 1/f$ ($f$: the focal length)

where def is the defocus quantity detected, and x is the lens position (x=0 when focalized to infinity). When calculating the distance to the object, the action proceeds to step (303).

In step (303), the zoom position is settled from the distance of the central object that is obtained in step (302).

Figure 10A:
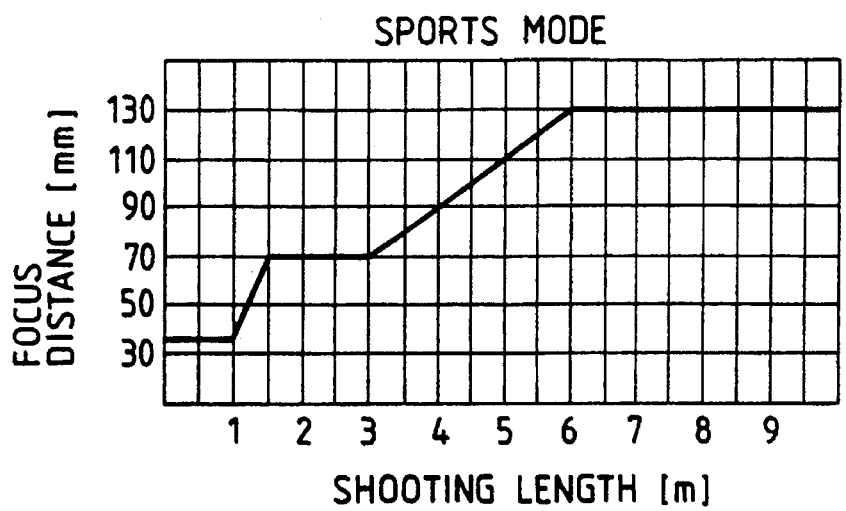
FIGS. 10A to 10C are zoom program diagrams in the first embodiment of this invention.
Figure 10B:
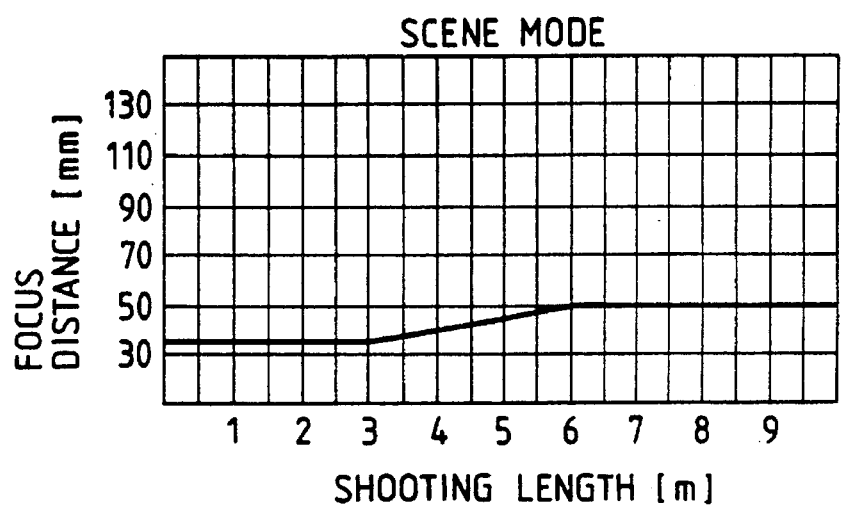
Figure 10C:
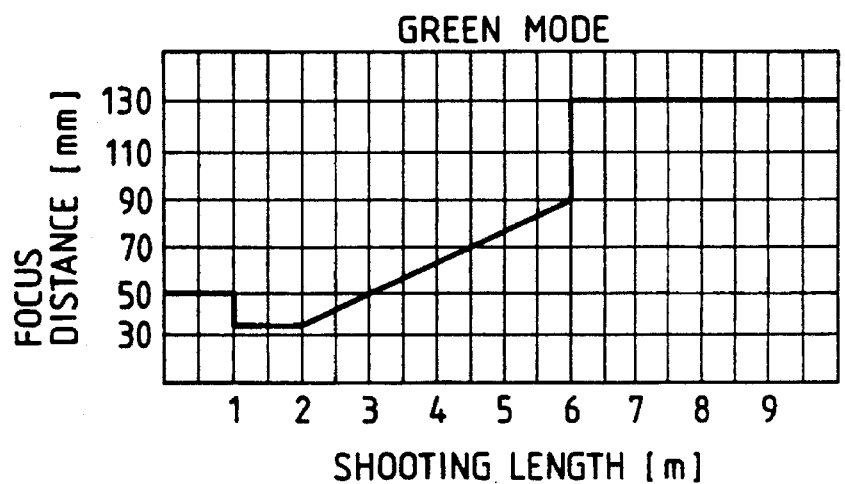

The zoom position is settled per mode in accordance with zoom program diagrams of FIGS. 10A to 10C.

FIG. 10A shows a case where the photographing mode is a sports (and portrait) mode. FIG. 10B shows a scene mode in which a wide-angle zoom position is to be selected. FIG. 10C shows a green (and close-up) mode programmed so that the focal length is 50 mm at a short distance. Then, the focal length is restricted to 130 mm so as not be too large in any zoom mode. When the zoom position is settled, the action proceeds to next step (304). Note that a table of FIG. 10 is stored in the memory, and the focal length (zoom position) is determined based on the object distance obtained in step 302.

Effected in step (304) is a zoom drive to the zoom position settled in step (303). This zoom drive is executed by performing predetermined lens communications. The lens-side control circuit LPRS, when receiving a zoom drive instruction, drives the optical system up to a predetermined zoom position. For this reason, there is no necessity for, after the lens communications, monitoring the zoom position from the camera side. When finishing the zoom drive, the action proceeds to step (305), wherein this [zoom position settlement] subroutine is returned.

According to the first embodiment discussed above, when the focus detection area is designated, it is determined that the photographer has some purpose, and consequently the auto-zoom is automatically inhibited. The photography can be therefore done without an unexpected change in the zoom position or taking trouble to switch over the zoom mode. On the other hand, in the case of the focus detection area auto selection, the auto-zoom works effectively. It is possible to take a shot in the optimum zoom position.

(Second Embodiment)

FIG. 11 is a flowchart showing the operations of the principal elements of the auto-zoom camera in a second embodiment. Note that the camera mechanisms (circuitry and mechanical constructions) and other operations (other than the operations in FIG. 11) are the same as those in the first embodiment and hence omitted herein.

FIG. 11 is the explanatory flowchart of a [focus detection & auto-zoom] subroutine in the auto-zoom camera in the second embodiment.

In step (401), whether manual focus has been selected is checked. In the case of the manual focus, the action goes to step (411). This subroutine is ended without executing the auto focus detection and the auto-zoom as well. Further, if manual focus, has not been selected the action shifts to step (402).

In step (402), whether or not the mode is a focus detection area designation mode is checked. If the mode is the focus detection area designation mode, the action shifts to step (405). Whereas if not, i.e., when the focus detection area is not designated, the action shifts to step (403).

In step (405), the focus detection is carried out in the designated focus detection area. Thereafter, the action proceeds to step (406).

Checked in step (406) is whether or not the focus detection area is a central area. If in the focus detection area designation mode, and when the focus detection area is designated to the central area, the action shifts to step (408). If the focus detection area is not the central area, the action shifts to step (407).

In step (407), the auto-zoom is inhibited. Simultaneously, the indication on the auto-zoom display element AZSG of the outer liquid crystal display panel OLC is extinguished. Thereafter, the action proceeds to step (411), wherein this [focus detection & zoom adjustment] subroutine is returned.

If it is determined that the focus detection area designation mode has not been selected in step (402), as described above, the action shifts to step (403).

In step (403), the focus detections are performed in all of the focus detection areas. Then, when finishing the focus detections, the action proceeds to step (404).

In step (404), the focus detection area is selected. The action in this step is to determine which object to focus among eventually three existing focus detection areas. For instance, an area of the closest object is selected. Then, the action proceeds to step (408).

Whether the zoom mode is the auto-zoom mode or not is checked in step (408). If the mode is the auto-zoom mode, the action shifts to step (409). Whereas if not the auto-zoom mode, the action proceeds to step (411), wherein this [focus detection & zoom adjustment] subroutine is returned.

In step (409), whether or not the zoom position has already been settled in the auto-zoom mode is checked. If unsettled, the action branches off to step (410). Whereas if the zoom position is settled, the action proceeds to step (411), wherein this [focus detection & zoom adjustment] subroutine is returned.

In step (410), as in the same way with step (208) of FIG. 8, the zoom position is settled based on a focus detection result, etc. Namely, the [zoom position settlement] subroutine is executed. Then, after settling the zoom position, this [focus detection & zoom adjustment] subroutine is returned.

In accordance with the second embodiment, the auto-zoom is set in the case of the focus detection area auto selection as well as setting the central focus detection area. On the other hand, if the focus detection area is set off the center, the auto-zoom is inhibited. Hence, the auto-zoom works effectively, and, if unnecessary, the auto zoom is automatically inhibited.

(Third Embodiment)

Figure 12:
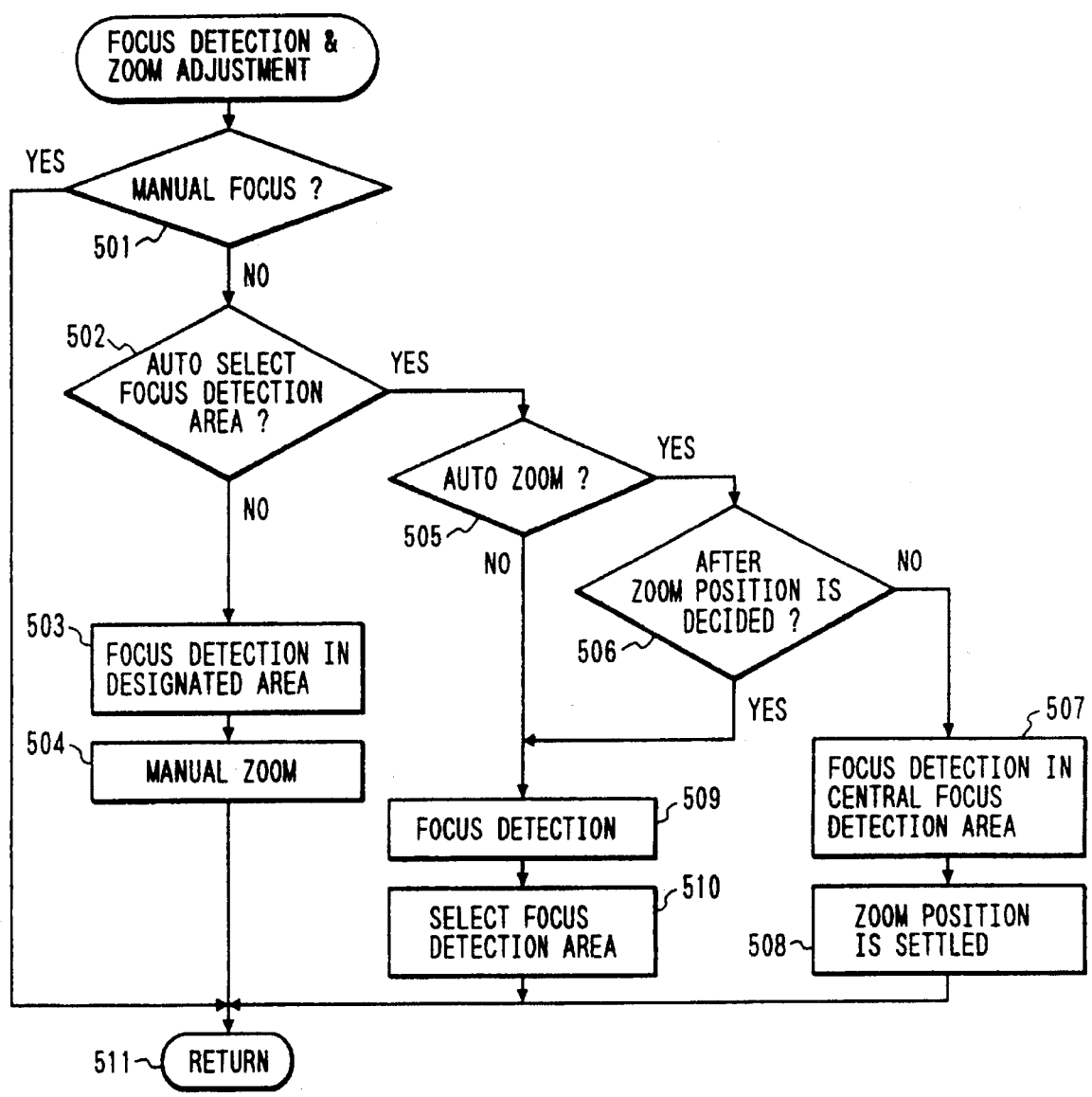
FIG. 12 is a flowchart showing an operation of the [focus detection & zoom adjustment] in a third embodiment of this invention.

FIG. 12 is a flowchart showing the operations of the principal elements of the auto-zoom camera in a third embodiment. Note that the camera mechanisms and other operations (other than the operations in FIG. 12) are the same as those in the first embodiment and hence omitted herein.

FIG. 12 is the explanatory flowchart of a [focus detection & auto-zoom] subroutine in the auto-zoom camera in the third embodiment.

In step (501), whether the focusing is the manual focus or not is checked. In the case of the manual focus, the action goes to step (511), wherein this [focus detection & auto-zoom] subroutine is ended. Further, if not the manual focus, the action shifts to step (502).

In step (502), whether or not the mode is a focus detection area auto selection mode is checked. If the mode is the focus detection area auto selection mode, the action shifts to step (505). Whereas if not the focus detection area auto selection mode, the action shifts to step (503).

In step (503), the focus detection is carried out in the designated focus detection area, and then the action proceeds to step (504).

In step (504), the auto-zoom mode is switched over to the manual zoom mode. An input of the zoom switch ZMMSW is accepted, and simultaneously, the indication on the auto-zoom display element AZSG of the outer liquid crystal display panel OLC is extinguished (the indication remains as it is when originally in the manual zoom mode). Next, the action proceeds to step (511), wherein this [focus detection & auto-zoom] subroutine is returned.

If determined to be the focus detection area auto selection mode in step (502), as explained above, the action shifts to step (505).

In step (505), whether the zoom mode is the auto-zoom mode or not is checked. Then, if the mode is the auto-zoom mode, the action shifts to step (506). If not the auto-zoom mode, the action shifts to step (509).

Whether or not a zoom position has already been settled is determined in step (506). If unsettled, the action shifts to step (507). Whereas if settled, the action shifts to step (509).

In step (509), the focus detections are carried out in all of the focus detection areas. When finishing the focus detections, the action proceeds to step (510).

In step (510), the focus detection area is selected. The action in this step is, as in the same way with the embodiment discussed above, to determine which object to focus among eventually three existing focus detection areas. Next, the action proceeds to step (511), wherein this [focus detection & zoom adjustment] subroutine is returned.

When determining that the zoom position is not settled in step (506), as described above, the action shifts to step (507).

In step (507), the focus detection is conducted in the central focus detection area to settle the zoom position. Then, the action proceeds to step (508).

In step (508), the zoom position is settled. When the zoom position is settled, the action proceeds to step (511), wherein this [focus detection & zoom adjustment] subroutine is returned.

According to the third embodiment, the camera operates as the auto-zoom remains unchanged in the case of the focus detection area auto selection mode. If the focus detection area is set, the auto-zoom mode is automatically switched over to the manual mode. Hence, there can be achieved the photography which reflects a photographer's intention in taking the picture.

(Fourth Embodiment)

Figure 13:
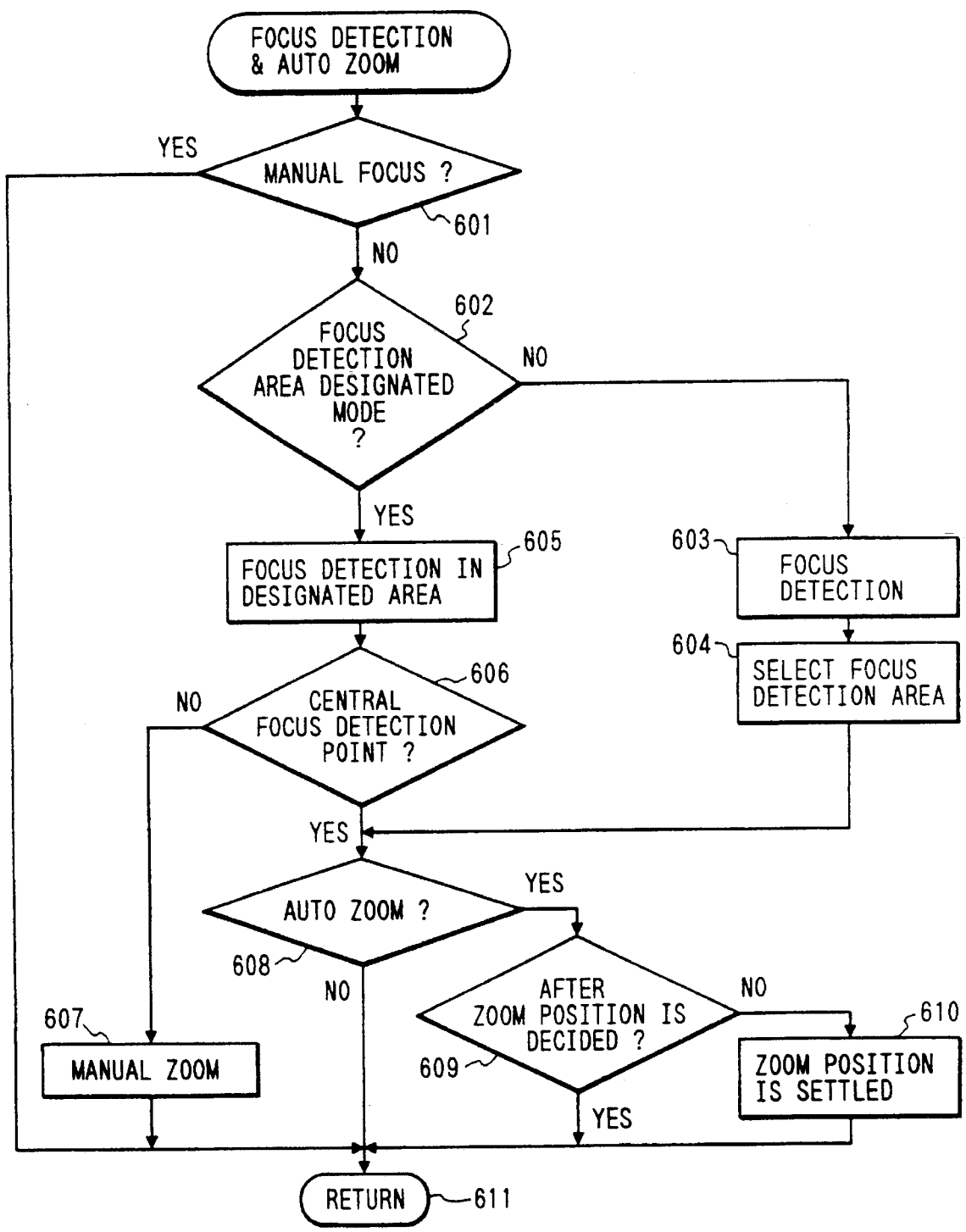
FIG. 13 is a flowchart showing an operation of the [focus detection & zoom adjustment] in a fourth embodiment of this invention.

FIG. 13 is a flowchart showing the operations of the principal elements of the auto-zoom camera in a fourth embodiment. Note that the camera mechanisms and other operations (other than the operations in FIG. 13) are the same as those in the first embodiment and hence omitted herein.

FIG. 13 is the explanatory flowchart of a [focus detection & auto-zoom] subroutine in the auto-zoom camera in the fourth embodiment.

In step (601), whether the focusing is the manual focus or not is checked. In the case of the manual focus, the action goes to step (611) without performing the auto focus detection and the auto-zoom as well, wherein this [focus detection & auto-zoom] subroutine is ended. Further, if not the manual focus, the action shifts to step (602).

In step (602), whether or not the mode is a focus detection area designation mode is checked. If the mode is the focus detection area designation mode, the action shifts to step (605). Whereas if not the focus detection area designation mode, the action shifts to step (603).

In step (605), the focus detection is carried out in the designated focus detection area. Thereafter, the action proceeds to step (606).

In step (606), whether or not the focus detection area is the central area is checked. If the focus detection is effected when the focus detection area is designated to the central area in the focus detection area designation mode, the action proceeds to step (608). Whereas if the focus detection area is not the central area, the action proceeds to step (607).

In step (607), the auto-zoom mode is switched over to the manual zoom mode. That is, an input of the zoom switch ZMMSW is permitted, and simultaneously, the indication on the auto-zoom display element AZSG of the outer liquid crystal display panel OLC is extinguished. Thereafter, the action proceeds to step (611), wherein this [focus detection & auto-zoom] subroutine is returned.

If determined not to be the focus detection area designation mode in step (602), as explained above, the action shifts to step (603).

In step (603), the focus detections are effected in all of the focus detection areas. Then, when finishing the focus detections, the action proceeds to step (604).

In step (604), the focus detection area is selected. The action in this step is to determine which object to focus among eventually three existing focus detection areas. Then, the action proceeds to step (608).

In step (608), whether or not the zoom mode is the auto-zoom mode is checked. In the case of the auto-zoom mode, the action shifts to step (609). If not the auto-zoom mode, the action proceeds to step (611), wherein this [focus detection & auto-zoom] subroutine is returned.

In step (609), whether or not the zoom position has already been settled in the auto-zoom mode is checked. If unsettled, the action shifts to step (610). Whereas if the zoom position is settled, the action proceeds to step (611), wherein this [focus detection & auto-zoom] subroutine is returned.

In step (610), as in the same way with step (208) of FIG. 8, the zoom position is settled based on a focus detection result, etc. Namely, the [zoom position settlement] subroutine is executed. Then, after settling the zoom position, this [focus detection & auto-zoom] subroutine is returned.

In accordance with the fourth embodiment, the auto-zoom is set in the case of the focus detection area auto selection as well as setting the central focus detection area. On the other hand, if the focus detection area is set off the center, the auto-zoom is inhibited. Hence, the auto-zoom works effectively, and, if unnecessary, this is automatically inhibited.

(Fifth Embodiment)

Figure 14:
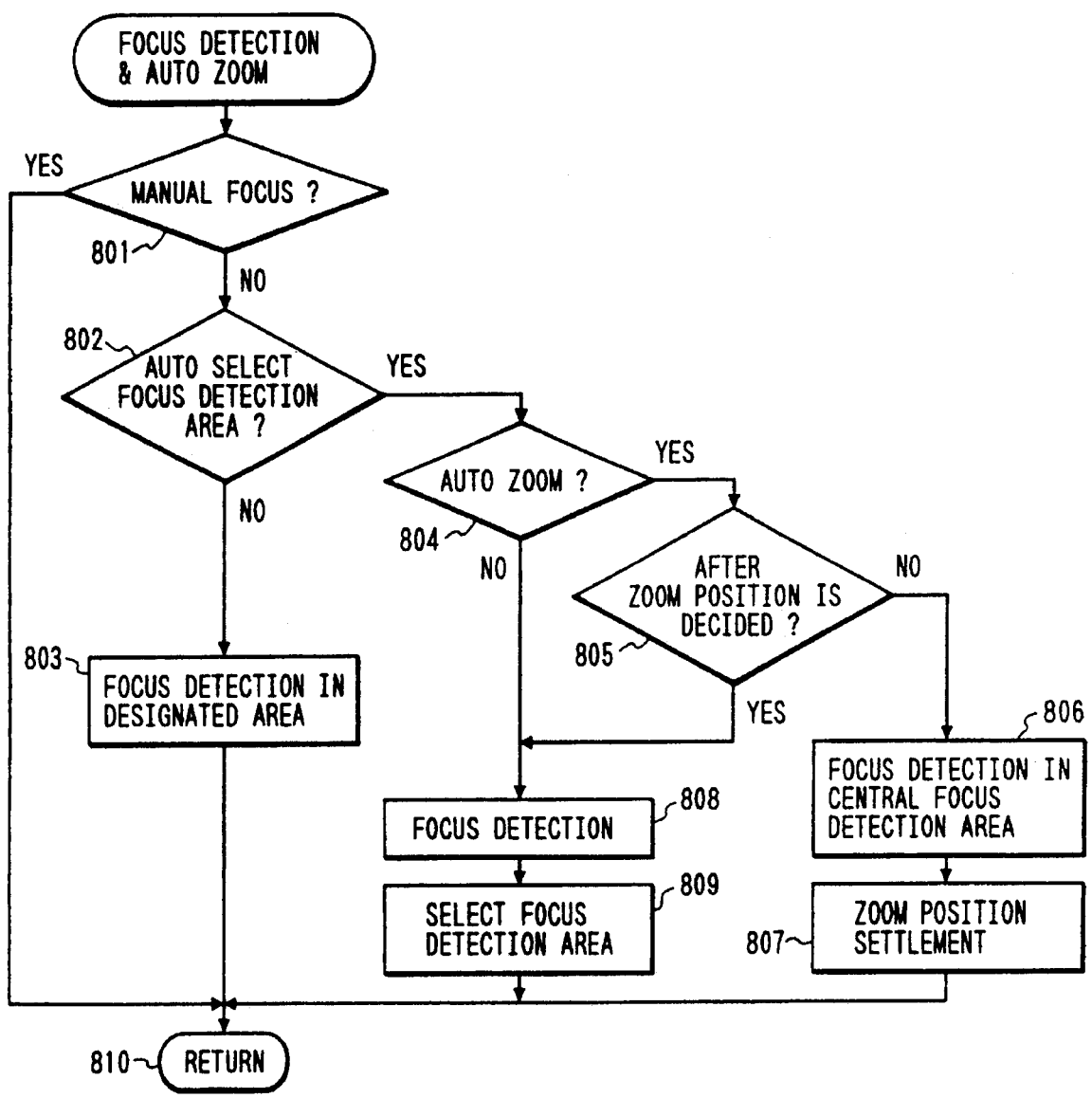
FIG. 14 is a flowchart showing an operation of the [focus detection & zoom adjustment] in a fifth embodiment of this invention.

FIG. 14 is a flowchart showing the operations of the principal elements of the auto-zoom camera in a fifth embodiment. Note that the camera mechanisms and operations other than those shown in FIG. 14 are the same as those in the first embodiment and hence omitted herein.

In step (801), whether focusing has been selected is checked. In the case of manual focus, the action shifts to step (810). In this case, this subroutine is ended without effecting the auto focus detection and the auto-zoom as well. Further, if manual focus, has not been selected the action shifts to step (802).

In step (802), whether or not the focus detection area mode is the auto mode is checked. In the case of the focus detection area auto selection mode, the action shifts to step (804). If the focus detection area is designated, the action shifts to step (803).

In step (803), the focus detection is carried out in the designated focus detection area, and thereafter the action proceeds to step (810), wherein this [focus detection & auto-zoom] subroutine is returned.

If determined to be the focus detection area auto selection mode in step (802), as described above, the action shifts to step (804).

In step (804), whether or not the zoom mode is the auto-zoom mode is checked. If the mode is the auto-zoom mode, the action shifts to step (805). Whereas if not the auto-zoom mode, the action shifts to step (808).

Whether or not a zoom position has already been settled is determined in step (805). If settled, the action shifts to step (808). Whereas if unsettled, the action shifts to step (806).

In step (806), the focus detection is carried out in the central focus detection area. The focus detection conducted herein is intended to determine the zoom. The zoom position is settled based on a result of this focus detection. The reason why the central focus detection area is employed is that the object undergoing the focus detection does not change even with a variation in zooming. When finishing this focus detection, the action proceeds to step (807).

In step (807), the zoom position based on the result of the focus detection obtained in above step (806) is settled. That is, a [zoom position settlement] subroutine which will be stated later is executed. Then, after settling the zoom position, the action proceeds to step (810), wherein this [focus detection & auto-zoom] subroutine is returned.

The focus detection is performed in step (808). This step is executed if not the auto-zoom and after the zoom position has been settled in the auto-zoom. Hence, the object undergoing the focus detection does not change due to the variation in the zoom even by effecting the focus detection in the peripheral focus detection area. Thereafter, the action proceeds to step (809).

In step (809), the focus detection area is selected. The action in this step is to determine which object to focus among eventually three existing focus detection areas. Thereafter, the action proceeds to step (810), wherein this [focus detection & auto-zoom] subroutine is returned.

According to the fifth embodiment discussed above, the focus detection area is selected after settling the zoom position in the central focus detection area. Hence, even when the focus detection area is set off the center, there is eliminated a possibility where the object is out of the focus detection area due to the zooming operation. Further, when designating the focus detection area, the auto-zoom is not conducted. Accordingly, there is also eliminated possibilities in which zooming is performed contrary to the photographer's intention when effecting the focus detection in the peripheral area, or the object is out of the focus detection area.

(Sixth Embodiment)

Figure 15:
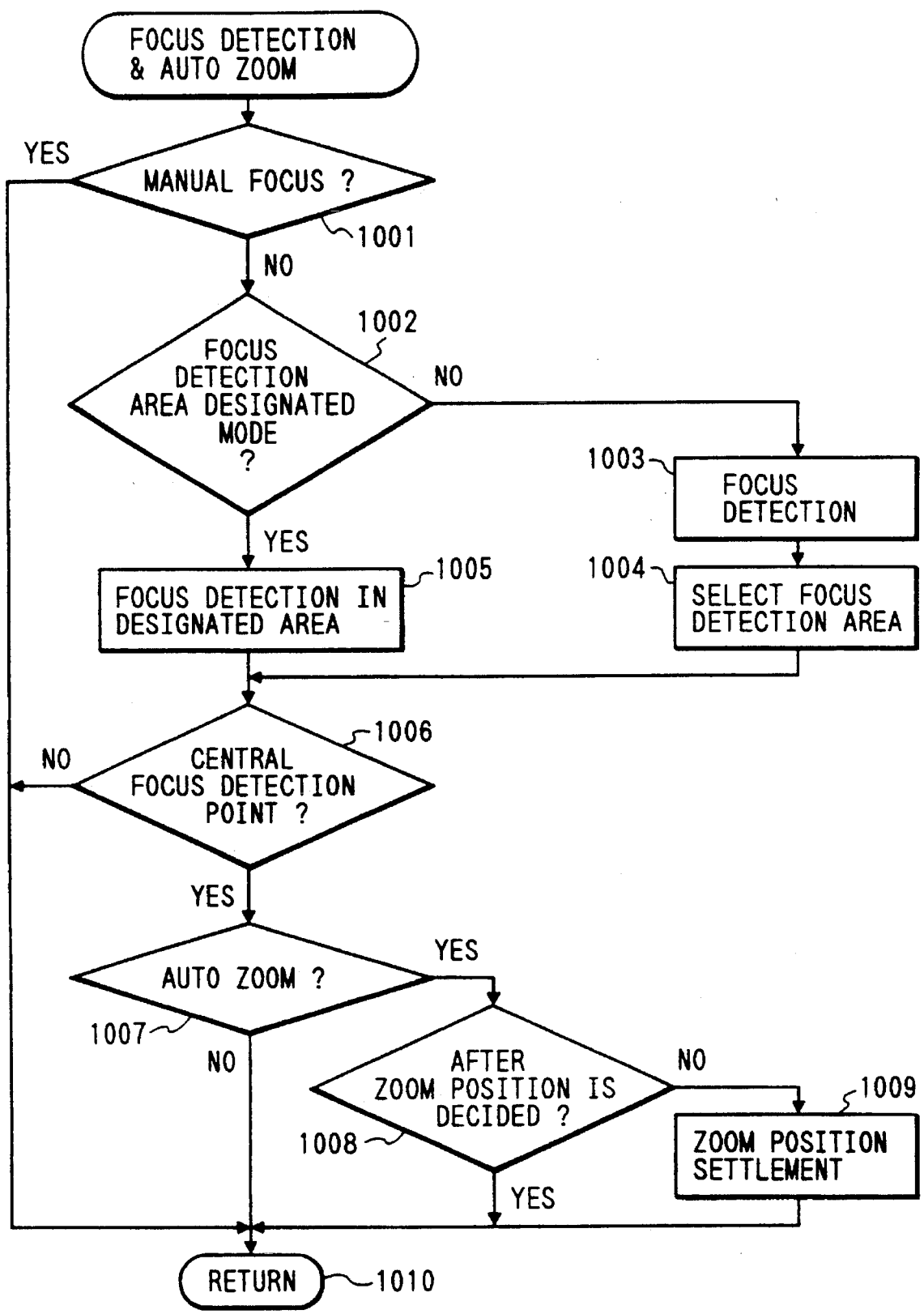
FIG. 15 is a flowchart showing an operation of the [focus detection & zoom adjustment] in a sixth embodiment of this invention.

FIG. 15 is a flowchart showing the operations of the principal elements of the auto-zoom camera in a sixth embodiment. Note that the camera mechanisms and operations other than those shown in FIG. 15 are the same as those in the first embodiment and hence omitted herein.

In step (1001), whether the focusing is the manual focus or not is checked. In the case of the manual focus, the action shifts to step (1010). This subroutine is ended without effecting the auto focus detection and the auto-zoom as well. Further, if not the manual focus, the action shifts to step (1002).

In step (1002), whether or not the mode is the focus detection area designation mode is checked. In the case of the focus detection area designation mode, the action shifts to step (1005). If the focus detection area is not designated, the action shifts to step (1003).

In step (1005), the focus detection is carried out in the designated focus detection area, and thereafter the action proceeds to step (1006).

If determined not to be the focus detection area designation mode in step (1002), as explained earlier, the action shifts to step (1003).

In step (1003), the focus detections are performed in all of the focus detection areas. Then, when finishing the focus detections, the action proceeds to step (1004).

In step (1004), the focus detection area is selected. The action in this step is to determine which object to focus among eventually three existing focus detection areas. Then, the action proceeds to step (1006).

In step (1006), whether or not the focus detection area is central area is determined. The action shifts to step (1007) when performing the focus detection in the focus detection area designation mode and when the focus detection area is selectively set to the central area in the focus detection area auto selection mode. Besides, if the focus detection area is not the central area, the action shifts to step (1010). This [focus detection & auto-zoom] subroutine is returned without executing the auto-zoom.

In step (1007), whether the zoom mode is the auto-zoom mode or not is determined. If the mode is the auto-zoom mode, the action shifts to step (1008). Whereas if not the auto-zoom mode, the action shifts to step (1010), wherein this [focus detection & zoom adjustment] subroutine is returned.

Whether or not a zoom position has already been settled is determined in step (1008). If unsettled, the action shifts to step (1009). Further, if the zoom position is settled, the action shifts to step (1010), wherein this [focus detection & zoom adjustment] subroutine is returned.

In step (1009), as in the same way with step (807) of FIG. 14, the zoom position is settled based on a focus detection result, etc. Namely, the [zoom position settlement] subroutine is executed. Then, after settling the zoom position, the action proceeds to step (1010) wherein this [focus detection & zoom adjustment] subroutine is returned.

In accordance with the sixth embodiment, the auto-zoom is restricted to the central focus detection area. Hence, there is eliminated the possibility in which the object is out of the focus detection area due to zooming.

(Seventh Embodiment)

Figure 16:
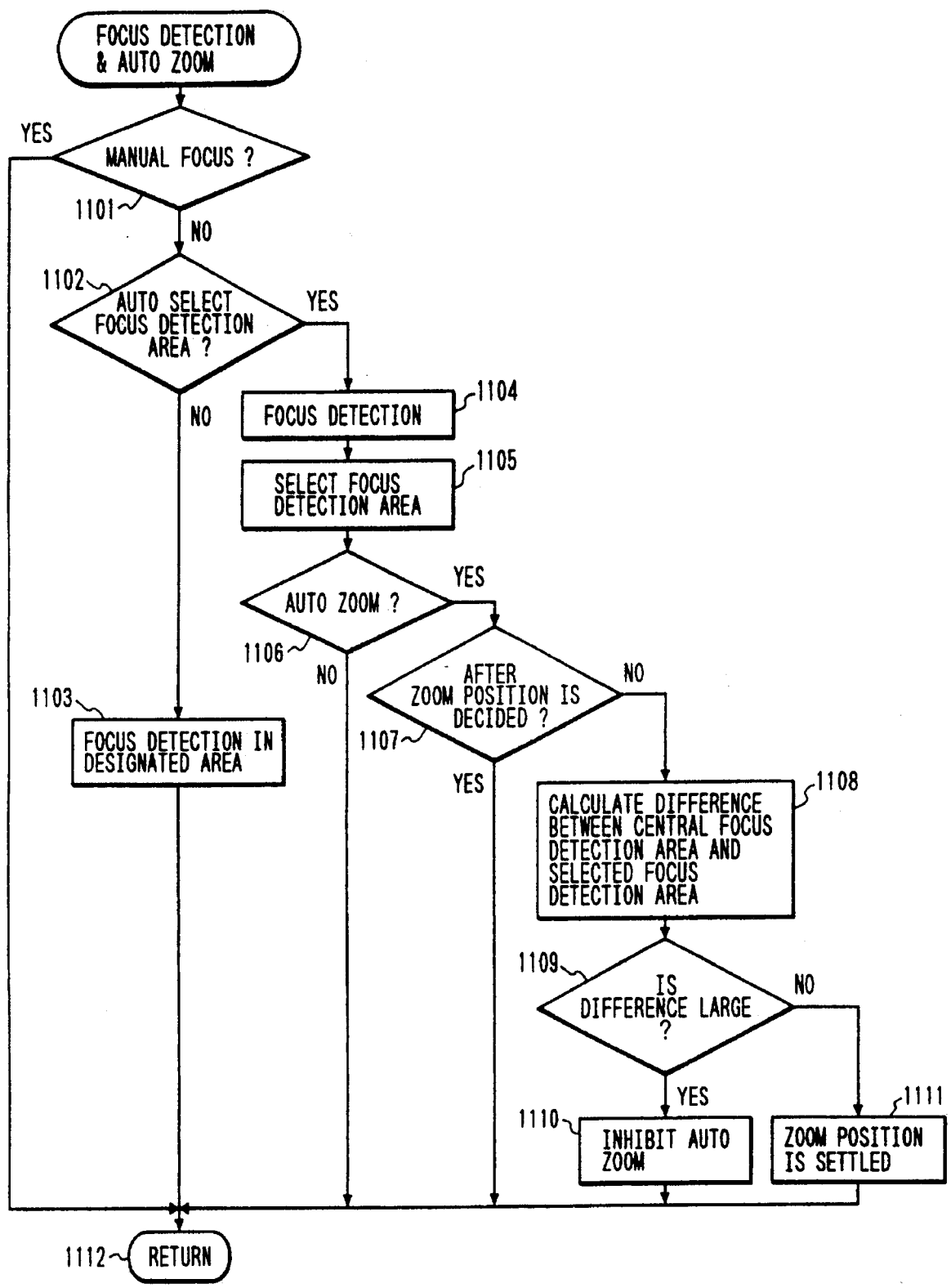
FIG. 16 is a flowchart showing an operation of the [focus detection & zoom adjustment] in a seventh embodiment of this invention.

FIG. 16 is a flowchart showing the operations of the principal elements of the auto-zoom camera in a seventh embodiment. Note that the camera mechanisms and operations other than those shown in FIG. 16 are the same as those in the first embodiment and hence omitted herein.

In step (1101), whether the focusing is the manual focus or not is checked. In the case of the manual focus, the action shifts to step (1112) without performing the auto focus detection and the auto-zoom as well. This [focus detection & auto-zoom] subroutine is ended. Further, if not the manual focus, the action shifts to step (1102).

In step (1102), whether or not the mode is the focus detection area auto selection mode is checked. If the mode is the focus detection area auto selection mode, the action shifts to step (1104). Whereas if not the focus detection area auto selection mode, the action shifts to step (1103).

In step (1103), the focus detection is carried out in the designated focus detection area, and thereafter the action proceeds to step (1112), wherein this [focus detection & auto-zoom] subroutine is returned.

If determined to be the focus detection area auto selection mode in step (1102), as described above, the action shifts to step (1104).

In step (1104), the focus detections are performed in all of the focus detection areas. Then, when finishing the focus detections, the action proceeds to step (1105).

In step (1105), the focus detection area is selected. The action in this step is to determine which object to focus among eventually three existing focus detection areas. Next, the action proceeds to step (1106).

Whether the zoom mode is the auto-zoom mode or not is checked in step (1106). Then, in the case of the auto-zoom mode, the action shifts to step (1107). Whereas if not the auto-zoom mode, the action shifts to step (1112), wherein this [focus detection & auto-zoom] subroutine is returned.

In step (1107), whether or not the zoom position has already been settled in the auto-zoom mode is checked. If unsettled, the action shifts to step (1108). Whereas if the zoom position is settled, the action shifts to step (1112), wherein this [focus detection & auto-zoom] subroutine is returned.

In step (1108), a defocus difference between the central focus detection area and the selected focus detection area is calculated. As a matter of course, when the central focus detection area is selected, the difference is 0. When finishing the calculation, the action proceeds to step (1109).

Calculated also are a distance of the focus detection area selected herein and a distance of the central focus detection area. A determination may be made from a difference therebetween.

In step (1109), the defocus difference calculated in above step (1108) is compared with a predetermined threshold value. If larger than the threshold value, it is determined that the object undergoing the focus detection in the selected focus detection area is not identical with the object undergoing the focus detection in the central focus detection area. In this case, the action shifts to step (1110). Further, if the defocus difference is smaller than the threshold value, it is determined that the identical object is subjected to the focus detection both in the selected focus detection area and in the central focus detection area. In this instance, the action shifts to step (1111).

In step (1110), the auto-zoom is inhibited. Herein, the zoom position is not shifted, and there is set the same flag as that set after settling the zoom position. The next auto-zoom is not conducted. The setting of this flag implies that the zoom position has already been settled. The auto-zoom can be inhibited. Next, the action shifts to step (1112), wherein this [focus detection & auto-zoom] subroutine is returned.

In step (1111), the zoom position is settled. When the zoom position is settled, the action shifts to step (1112), wherein this [focus detection & auto-zoom] subroutine is returned.

According to the seventh embodiment, whether or not the auto-zoom in the focus detection area auto selection mode is executed is determined based on the defocus difference between the central focus detection area and the selected focus detection area. Consequently, there is no possibility in which zooming takes place when the object is out of the focus detection area due to zooming. There is also no possibility in which zooming is excessively inhibited when the auto-zoom is preferable.

(Eighth Embodiment)

Figure 17:
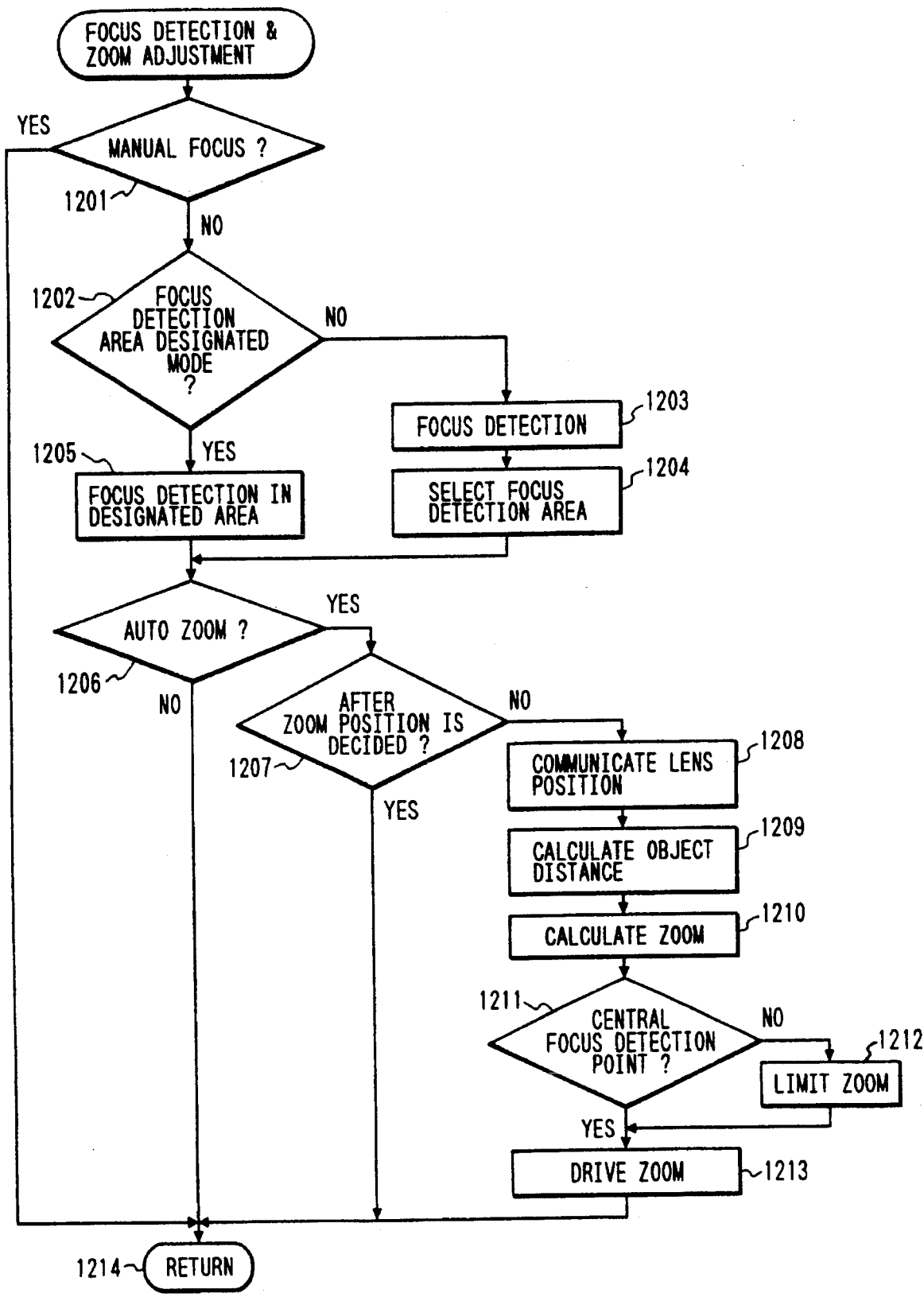
FIG. 17 is a flowchart showing an operation of the [focus detection & zoom adjustment] in an eighth embodiment of this invention.

FIG. 17 is a flowchart showing the operations of the principal elements of the auto-zoom camera in an eighth embodiment. Note that the camera mechanisms and operations other than those shown in FIG. 19 are the same as those in the first embodiment and hence omitted herein.

In step (1201), whether the focusing is the manual focus or not is checked. In the case of the manual focus, the action shifts to step (1214). This subroutine is ended without effecting the auto focus detection and the auto-zoom as well. Further, if not the manual focus, the action shifts to step (1202).

In step (1202), whether or not the mode is the focus detection area designation mode is checked. In the case of the focus detection area designation mode, the action shifts to step (1205). If the focus detection area is not designated, the action shifts to step (1203).

In step (1205), the focus detection is carried out in the designated focus detection area, and thereafter the action proceeds to step (1206).

If determined not to be the focus detection area designation mode in step (1202), as explained earlier, the action shifts to step (1203).

In step (1203), the focus detections are performed in all of the focus detection areas. Then, when finishing the focus detections, the action proceeds to step (1204).

In step (1204), the focus detection area is selected. The action in this step is to determine which object to focus among eventually three existing focus detection areas. Then, the action proceeds to step (1206).

In step (1206), whether the zoom mode is the auto-zoom mode or not is determined. If the mode is the auto-zoom mode, the action shifts to step (1207). Whereas if not the auto-zoom mode, the action shifts to step (1214), wherein this [focus detection & zoom adjustment] subroutine is returned.

Whether or not a zoom position has already been settled is determined in step (1207). If unsettled, the action branches off to step (1208). Further, if the zoom position is settled, the action shifts to step (1214), wherein this [focus detection & zoom adjustment] subroutine is returned.

In step (1208), the present zoom position and distance are obtained by performing the lens communications. Subsequently, the action proceeds to step (1209).

Calculated in step (1209) are an object distance in the auto-selected focus detection area and an object distance in the focus detected area designated in the focus detection area designation mode. A method of the calculation is the same with the step (302) of FIG. 9. Then, the action proceeds to step (1210).

In step (1210), the zoom position is settled from the object distances obtained in above step (1209).

In step (1211), whether or not the focus detection area is the central area is determined. If the area is the central focus detection area, the action shifts to step (1213). Whereas if not, the action shifts to step (1212).

In step (1212), the focus detection area is the area other than the central one, zooming control is effected in this step. When the zoom position is largely shifted with the focus detection area being an area other the central area, the object undergoing the focus detection is out of the focus detection area. The focus adjustment therefore becomes impossible. Concretely, the present zoom position obtained in above step (1208) is compared with the zoom position calculated in above step (1210). If a variation quantity exceeds a fixed threshold value, the zoom position of the auto-zoom is regulated. More specifically, a zoom ratio is inhibited from changing in excess of a predetermined fixed quantity with respect to the present zoom position in step (1212). The zoom position is regulated to the zoom ratio falling within the fixed quantity with respect to the present zoom position. Then, the action proceeds to step (1213).

In step (1213), the zoom drive is executed to the zoom position calculated in above step (1210) or the zoom position regulated in step (1212). Subsequently, the action proceeds to step (1214), wherein this [focus detection & zoom adjustment] subroutine is returned.

According to the eighth embodiment, when effecting the auto-zoom, the zooming regulation is not done in the case of the central focus detection area. In the case of the peripheral focus detection area, the zoom variation quantity is limited. The auto-zoom can be therefore sufficiently utilized without the object being out of the focus detection area due to zooming.

(Ninth Embodiment)

Figure 18:
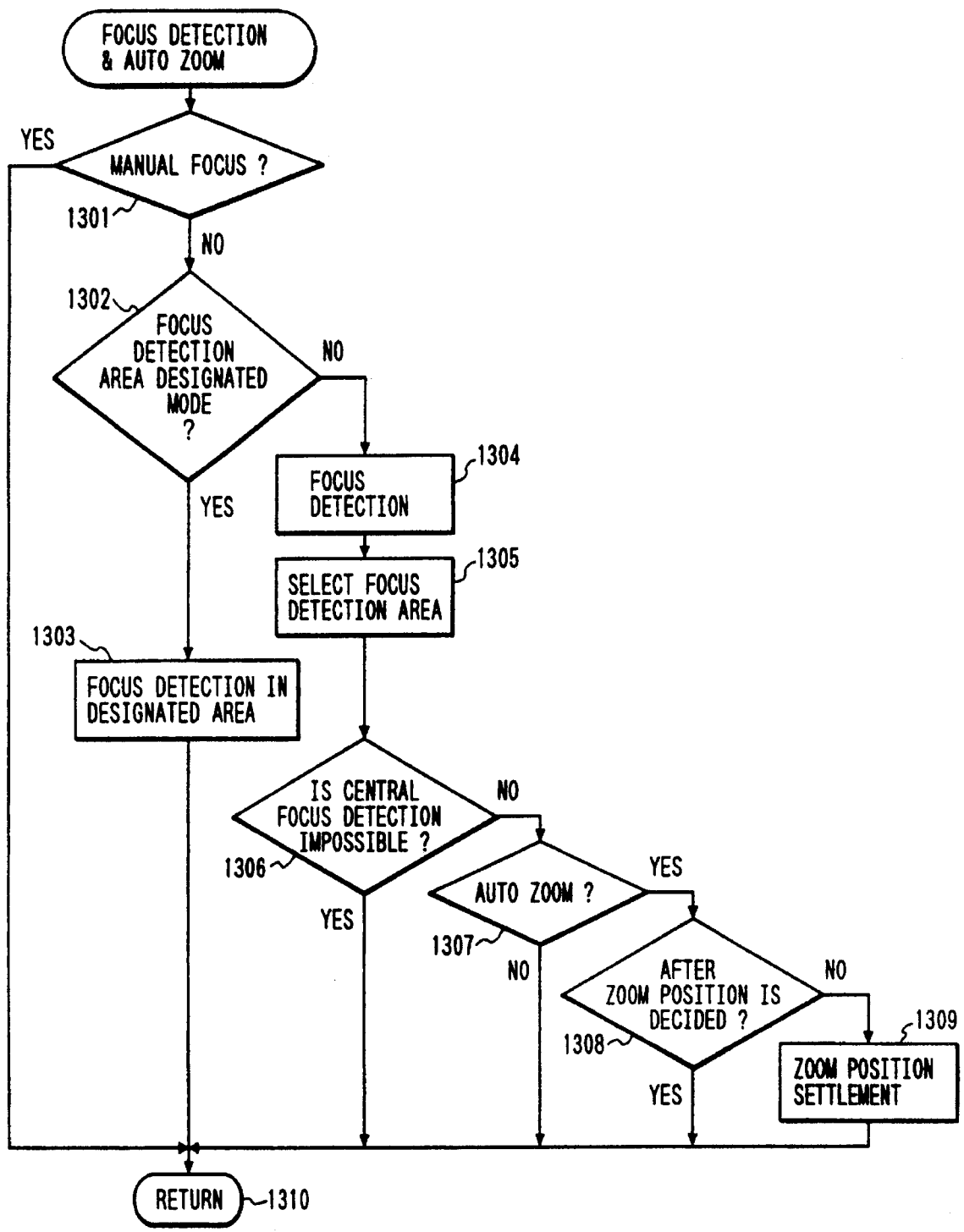
FIG. 18 is a flowchart showing an operation of the [focus detection & zoom adjustment] in a ninth embodiment of this invention.

FIG. 18 is a flowchart showing the operations of the principal elements of the auto-zoom camera in a ninth embodiment. Note that the camera mechanisms and operations other than those shown in FIG. 18 are the same as those in the first embodiment and hence omitted herein.

In step (1301), whether manual focusing has been selected is checked. In the case of the manual focus selection, the action shifts to step (1310) without performing the auto focus detection and the auto-zoom as well. This [focus detection & auto-zoom] subroutine is ended. Further, if manual focus, has not been selected the action shifts to step (1302).

In step (1302), whether or not the mode is the focus detection area designation is checked. If the mode is the focus detection area designation mode, the action shifts to step (1303). Whereas if not the focus detection area designation mode, the action shifts to step (1304).

In step (1303), the focus detection is carried out in the designated focus detection area, and thereafter the action shifts to step (1310), wherein this [focus detection & auto-zoom] subroutine is returned.

If determined to be the focus detection area designation mode in step (1302), as described above, the action shifts to step (1304).

In step (1304), the focus detections are performed in all of the focus detection areas. When finishing the focus detections, the action proceeds to step (1305).

In step (1305), the focus detection area is selected. The action in this step is to determine which object to focus among eventually three existing focus detection areas. Next, the action proceeds to step (1306).

In step (1306), whether or not the focus is undetectable in the central focus detection area is determined. If the focus is undetectable, the action shifts to step (1310), this [focus detection & auto-zoom] subroutine is returned. Namely, after selecting a focus detection area other than the central area, and if the selected focus detection area becomes incapable in terms of the focus detection because of a variation in zooming, the focus is adjustable on condition that the focus could be detected in the central focus detection area. However, if the central focus detection area is focus-undetectable, it happens that the focus detection can not be done because of effecting the auto-zoom. To prevent this, zooming is not carried out when the focus is undetectable in the central focus detection area. Conversely, even when the peripheral focus detection area is selected, the auto-zoom is performed if the central focus detection area is focus-detectable. Hence, the action shifts to step (1307).

Whether the zoom mode is the auto-zoom mode or not is determined in step (1307). Then, in the case of the auto-zoom mode, the action shifts to step (1308). Whereas if not the auto-zoom mode, the action shifts to step (1310), wherein this [focus detection & auto-zoom] subroutine is returned.

In step (1308), whether or not the zoom position has already been settled in the auto-zoom mode is checked. If unsettled, the action shifts to step (1309). Whereas if the zoom position is settled, the action shifts to step (1310), wherein this [focus detection & auto-zoom] subroutine is returned.

In step (1309), as in the same way with step (807) of FIG. 14, the zoom position is settled based on a focus detection result, etc. Namely, the [zoom position settlement] subroutine is executed. After settling the zoom position, the action proceeds to step (1310), wherein this [focus detection & zoom adjustment] subroutine is returned.

In accordance with the ninth embodiment, when in the focus detection area auto selection mode in the auto-zoom, the auto-zoom is not conducted only when selecting the central focus detection area. The auto-zoom operates if the central focus detection area is focus-detectable also when selecting the peripheral focus detection area. For this reason, the easy-to-operate auto zoom can be actualized, wherein the auto focus adjustment does not become impossible when the object is out of the focus detection area due to zooming.

It is apparent that, in this invention, a wide range of different working modes can be formed based on the invention without deviating from the spirit and scope of the invention. This invention is not restricted by its specific working modes except being limited by the appended claims.

What is claimed is:

1. A camera having a detecting device, the detecting device outputting respective signals for focusing respective objects located at a plurality of different areas, the camera having an auto-zoom function for automatically shifting a zoom state to a predetermined state, said camera comprising:

an area selection circuit having a first mode for a photographer to select an arbitrary area among the plurality of different areas and a second mode for automatically selecting a predetermined area among the different areas; and an inhibiting circuit for inhibiting the auto-zoom function when said selecting circuit selects the first mode.

2. The camera according to claim 1, further comprising a control circuit for making the auto-zoom function operative on the basis of the signal outputted for the specific area independently of the area selected by said selecting circuit when said selecting circuit selects the second mode.

3. The camera according to claim 2, wherein the specific area is a central area.

4. The camera according to claim 1, wherein the auto-zoom function performs zoom control in accordance with a signal output by the detecting device.

5. The camera according to claim 1, wherein the auto-zoom function performs zoom control in accordance with an object distance.

6. A camera having a detecting device, the detecting device outputting respective signals for focusing respective objects located at a plurality of different areas, the camera having an auto-zoom function for automatically shifting a zoom state to a predetermined state, said camera comprising:

an area selection circuit for selecting at least one area among the plurality of different areas; and a circuit for permitting the auto-zoom function when the area selected by said selecting circuit is a specific area, said circuit inhibiting the auto-zoom function when the specific area is not selected by said selecting circuit.

7. The camera according to claim 6, wherein said selecting circuit causes the photographer to select an arbitrary area among the respective areas.

8. The camera according to claim 6, wherein said selecting circuit automatically selects a predetermined area among the respective areas.

9. The camera according to claim 6, wherein the specific area is a central area.

10. The camera according to claim 7, wherein said selecting circuit has an auto selection mode for automatically selecting a predetermined area among the respective areas and makes the auto-zoom function operative in the auto selection mode.

11. The camera according to claim 6, wherein the auto-zoom function performs zoom control in accordance with a signal output by the detecting device.

12. The camera according to claim 6, wherein the auto-zoom function performs zoom control in accordance with an object distance.

13. A camera having a detecting device, the detecting device outputting respective signals for focusing respective objects located at a plurality of different areas and, the camera having an auto-zoom function for automatically shifting a zoom state to a predetermined state, said camera comprising:

an area selection circuit for selecting at least one area among the plurality of different areas; and an inhibiting circuit for inhibiting the auto-zoom function when the area selected by said selecting circuit is a specific area, said inhibiting circuit permitting the auto-zoom function when an area other than the specific area is selected by said selecting circuit.

14. The camera according to claim 13, wherein said selecting circuit causes the photographer to select an arbitrary area among the respective areas.

15. The camera according to claim 13, wherein said selecting circuit automatically selects a predetermined area among the respective areas.

16. The camera according to claim 13, wherein the specific area is an area in the most peripheral portion.

17. The camera according to claim 13, wherein the auto-zoom function performs zoom control in accordance with a signal output by the detecting device.

18. The camera according to claim 13, wherein the auto-zoom function performs zoom control in accordance with an object distance.

19. A camera having a detecting device, the detecting device outputting respective signals for focusing respective objects located at a plurality of different areas and, the camera having an auto-zoom function for automatically shifting a zoom state to a predetermined state, said camera comprising:

an area selection circuit for selecting one area among the respective areas; and a control circuit for making the auto-zoom function operative on the basis of a signal outputted for a specific area independently of the area selected by said selecting circuit.

20. The camera according to claim 19, wherein said selecting circuit automatically selects a predetermined area among the respective areas.

21. The camera according to claim 19, wherein the auto-zoom function performs zoom control in accordance with a signal output by the detecting device.

22. The camera according to claim 19, wherein the auto-zoom function performs zoom control in accordance with an object distance.

23. A camera having a detecting device, the detecting device outputting respective signals for focusing respective objects located at a plurality of different areas and, the camera having an auto-zoom function for automatically shifting a zoom state to a predetermined state, said camera comprising:

an area selection circuit for selecting at least one area among the respective areas; and an inhibiting circuit for inhibiting the auto-zoom function when a signal outputted for the area selected by said selecting circuit and a signal outputted for a specific area different from said one area have a predetermined relationship.

24. The camera according to claim 23, wherein said inhibiting circuit inhibits the auto-zoom function when the signals corresponding to the selected area and the one area are different by a predetermined value or larger.

25. The camera according to claim 24, wherein the specific area is a central area.

26. The camera according to claim 23, wherein the auto-zoom function performs zoom control in accordance with a signal output by the detecting device.

27. The camera according to claim 23, wherein the auto-zoom function performs zoom control in accordance with an object distance.

28. A camera having a detecting device, the detecting device outputting respective signals for focusing respective objects located at a plurality of different areas and, the camera having an auto-zoom function for automatically shifting a zoom state to a predetermined state, said camera comprising:

a determining circuit for determining whether or not a signal is detectable in a specific area among the plurality of different areas; and an inhibiting circuit for inhibiting the auto-zoom function when said determining circuit determines that the signal is undetectable for the specific area, said circuit inhibiting the auto-zoom function when the signal is undetectable for the specific area, even when the signal is detectable for an area other than the specific area.

29. The camera according to claim 28, wherein the specific area is a central area.

30. The camera according to claim 29, further comprising a selecting circuit for automatically selecting one area among the respective areas.

31. The camera according to claim 28, wherein the auto-zoom function performs zoom control in accordance with a signal output by the detecting device.

32. The camera according to claim 28, wherein the auto-zoom function performs zoom control in accordance with an object distance.

33. A camera having a detecting device, the detecting device outputting respective signals for focusing respective objects located at a plurality of different areas and, the camera having an auto-zoom function for automatically shifting a zoom state to a predetermined state, said camera comprising:

an area selecting circuit for selecting at least one area among the plurality of different areas; and a processing circuit for causing the auto-zoom function to be performed when the area selected by said selecting circuit is a specific area, said circuit setting a limit on a zoom amount for the auto-zoom function, and performing the auto-zoom function when an area other than the specific area is selected.

34. The camera according to claim 33, wherein said processing circuit performs zoom control when the specific area is selected.

35. The camera according to claim 33, wherein the auto-zoom function performs zoom control in accordance with a signal output by the detecting device.

36. The camera according to claim 33, wherein the auto-zoom function performs zoom control in accordance with an object distance.

37. A camera having an auto-focus mode and a manual focus mode, comprising:

selecting means for selecting one of the auto-focus mode and the manual focus mode;

an auto-zoom circuit for automatically shifting a zoom state to a predetermined state; and a control circuit for inhibiting an operation of said auto-zoom circuit when the manual focus mode is selected by said selecting means, said circuit permitting the operation of said auto-zoom circuit when the auto-focus mode is selected by said selecting means.

38. A camera having a detecting device, the detecting device outputting respective signals for focusing respective objects located at a plurality of different areas and, the camera having an auto-zoom function for automatically shifting a zoom state to a predetermined state, said camera comprising:

an area selecting circuit for selecting at least one area among the plurality of different areas; and a control circuit for causing said selection circuit to select a specific area when making the auto-zoom function operative.

39. The camera according to claim 38, wherein the specific area is a central area.

40. The camera according to claim 38, wherein the auto-zoom function performs zoom control in accordance with a signal output by the detecting device.

41. The camera according to claim 38, wherein the auto-zoom function performs zoom control in accordance with an object distance.

42. A camera comprising:

a defocus detecting means for detecting defocus states of a plurality of focus detection areas including at least a central part within a scene;

a first selecting means for causing said camera to automatically select at least one focus detection area from the plurality of focus detection areas;

a second selecting means for a photographer to select at least one arbitrary focus detection area from the plurality of focus detection areas;

a mode switching means for switching over a first photographing mode for effecting photography on the basis of the focus detection area selected by said first selecting means and a second photographing mode for effecting the photography on the basis of the focus detection area selected by said second selecting means;

a focus driving means for making a focus adjustment by driving a photographing lens in accordance with a defocus quantity of the selected focus detection area;

a focal length calculating means for calculating an optimum focal length of the photographing lens;

a zoom driving means for automatically driving the photographing lens to a focal length position obtained by said focal length calculating means; and a zoom inhibiting means for inhibiting a drive by said zoom driving means when said mode switching means sets the second photographing mode.

43. A camera comprising:

a focus detecting means for calculating distance information of a plurality of focus detection areas including at least a central part within a scene;

a first selecting means for causing said camera to automatically select at least one focus detection area from the plurality of focus detection areas;

a second selecting means for manually selecting at least one focus detection area from the plurality of focus detection areas;

a mode switching means for switching over a first photographing mode for effecting photography on the basis of the focus detection area selected by said first selecting means and a second photographing mode for effecting the photography on the basis of the focus detection area selected by said second selecting means;

a focus driving means for making a focus adjustment by driving a photographing lens in accordance with the distance information of the selected focus detection area;

a focal length calculating means for calculating an optimum focal length of the photographing lens;

a zoom driving means for automatically driving the photographing lens to a focal length position obtained by said focal length calculating means; and a zoom inhibiting means for inhibiting a drive by said zoom driving means when said mode switching means sets the second photographing mode.

44. A camera comprising:

a defocus detecting means for detecting defocus states of a plurality of focus detection areas including at least a central part within a scene;

a first selecting means for causing said camera to automatically select at least one focus detection area from the plurality of focus detection areas;

a second selecting means for manually selecting at least one focus detection area from the plurality of focus detection areas;

a focus driving means for making a focus adjustment by driving a photographing lens in accordance with a defocus quantity of the selected focus detection area;

a focal length calculating means for calculating an optimum focal length of the photographing lens;

a zoom driving means for automatically driving the photographing lens to a focal length position obtained by said focal length calculating means; and a zoom inhibiting means for inhibiting a drive by said zoom driving means when said second selecting means selects the focus detection area other than the central focus detection area.

45. A camera comprising:

a defocus detecting means for detecting defocus states of a plurality of focus detection areas including at least a central part within a scene;

a first selecting means for causing said camera to automatically select at least one focus detection area from the plurality of focus detection areas;

a second selecting means for manually selecting at least one focus detection area from the plurality of focus detection areas;

a mode switching means for switching over a first photographing mode for effecting photography on the basis of the focus detection area selected by said first selecting means and a second photographing mode for effecting the photography on the basis of the focus detection area selected by said second selecting means;

a focus driving means for making a focus adjustment by driving a photographing lens in accordance with a defocus quantity of the selected focus detection area;

a focal length calculating means for calculating an optimal focal length of the photographing lens;

an outside operating means for giving an indication to change the focal length;

a zoom driving means for automatically driving the photographing lens to a focal length position obtained by said focal length calculating means or a focal length position indicated by said outside operating means; and a zoom inhibiting means for permitting said outside operating means to change the focal length but inhibiting an operation of said focal length calculating means when said mode switching means sets the second photographing mode.

46. A camera comprising:

a defocus detecting means for detecting defocus states of a plurality of focus detection areas including at least a central part within a scene;

a first selecting means for causing said camera to automatically select at least one focus detection area from the plurality of focus detection areas;

a second selecting means for manually selecting at least one focus detection area from the plurality of focus detection areas;

a focus driving means for making a focus adjustment by driving a photographing lens in accordance with a defocus quantity of the selected focus detection area;

a focal length calculating means for calculating an optimum focal length of the photographing lens;

an outside operating means for giving an indication to change the focal length;

a zoom driving means for automatically driving the photographing lens to a focal length position obtained by said focal length calculating means or a focal length position indicated by said outside operating means; and a control means for permitting said outside operating means to change the focal length but inhibiting an operation of said focal length calculating means when said second selecting means selects the focus detection area other than the central focus detection area.

47. A camera comprising:

a defocus detecting means for detecting defocus states of a plurality of focus detection areas including at least a central part within a scene;

a focus driving means for making a focus adjustment by driving a photographing lens in accordance with a detected defocus quantity;

an object distance calculating means for calculating a distance to an object;

a focal length calculating means for calculating an optimum focal length of the photographing lens on the basis of the distance to the object from the central part among the plurality of focus detection areas by obtaining a distance to the object from the central part using said object distance calculating means after said defocus detecting means has detected a defocus of the central part; and a zoom driving means for automatically driving the photographing lens to a focal length position obtained by said focal length calculating means.

48. A camera comprising:

a defocus detecting means for detecting defocus states of a plurality of defocus detection areas including at least a central part within a scene;

a selecting means for automatically selecting at least one focus detection area from the plurality of focus detection areas;

a focus driving means for making a focus adjustment by driving a photographing lens in accordance with a defocus quantity of the focus detection area selected by said selecting means;

an object distance calculating means for calculating a distance to an object;

a focal length calculating means for calculating an optimum focal length of the photographing lens;

a zoom driving means for automatically driving the photographing lens to a focal length position obtained by said focal length calculating means; and a zoom inhibiting means for inhibiting the zoom drive by said zoom driving means when the focus detection area selected by said selecting means is not a central focus detection area.

49. A camera incorporating a multi-point auto focus device, the device inputting focusing information for independently focusing each object in a plurality of different areas, the camera having an auto-zoom mechanism for automatically shifting a zoom state to a predetermined state, the camera comprising:

an area selection circuit having a first mode for manually selecting an arbitrary area among the respective areas and a second mode for automatically selecting a predetermined area among the respective areas; and an inhibiting circuit for inhibiting the auto-zoom function when said selecting circuit selects the first mode.

50. A camera incorporating a multi-point auto focus device, the device inputting focusing information for independently focusing each object in a plurality of different areas, the camera having an auto-zoom mechanism for automatically shifting a zoom state to a predetermined state, the camera comprising:

an area selection circuit for selecting one predetermined area among the respective areas; and a circuit for permitting the auto-zoom function when the area selected by said selecting circuit is a specific area, said circuit inhibiting the auto-zoom function when an area other than the specific area is selected by said area selecting circuit.

51. A camera having a detecting device, the detecting device outputting respective signals for focusing respective objects located at a plurality of different areas, the camera having an auto-zoom function for automatically shifting a zoom state to a predetermined state, said camera comprising:

an area selecting circuit for selecting at least one area among the respective areas; and a control circuit for making the auto-zoom function operative on the basis of the outputted signal for a specific area independently of the area selected by said selecting circuit.

52. A camera incorporating a multi-point auto focus device, the device inputting focusing information for independently focusing each object in a plurality of different areas, the camera having an auto-zoom mechanism for automatically shifting a zoom state to a predetermined state, the camera comprising:

an area selection circuit for selecting one predetermined area among the respective areas; and an inhibiting circuit for inhibiting the auto-zoom function when a signal corresponding to the focusing information detected in the area selected by said selecting circuit and a signal corresponding to the focusing information detected in the specific area have a predetermined relationship.

53. A camera incorporating a multi-point auto focus device, the device inputting focusing information for independently focusing each object in a plurality of different areas, the camera having an auto-zoom mechanism for automatically shifting a zoom state to a predetermined state, the camera comprising:

a determining circuit for determining whether or not the focusing information is detectable in a specific area among the plurality of different areas; and an inhibiting circuit for inhibiting the auto-zoom function when said determining circuit determines that the focusing information is undetectable in the specific area, said circuit inhibiting the auto-zoom function when the focusing information is undetectable in the specific area, even when the focusing information is detectable in an area other than the specific area.

54. A camera incorporating a multi-point auto focus device, the device inputting focusing information for independently focusing each object in a plurality of different areas, the camera having an auto-zoom mechanism for automatically shifting a zoom state to a predetermined state, the camera comprising:

an area selection circuit for selecting one predetermined area among the plurality of different areas; and a processing circuit for causing the auto-zoom function when the area selected by said selecting circuit is a specific area, and said circuit setting a limit on a zoom amount by the auto-zoom function and performing a zoom function when an area other than the specific area is selected.

55. A camera incorporating a multi-point auto focus device, the device inputting focusing information for independently focusing each object in a plurality of different areas, the camera having an auto-zoom mechanism for automatically shifting a zoom state to a predetermined state, the camera comprising:

an area selection circuit for selecting one predetermined area among the plurality of different areas; and a control circuit for causing said selection circuit to select a specific area when making the auto-zoom function operative.

56. A camera having a detecting device, the detecting device outputting respective signals for focusing respective objects located at a plurality of different areas, the camera having a zoom function for performing a zoom operation, the camera comprising:

an area selection circuit having a first mode for a photographer to select an arbitrary area among the plurality of different areas, and a second mode for automatically selecting a predetermined area from among the respective areas; and a regulation circuit for regulating the zoom function in accordance with a selected mode.

57. A camera having a detecting device, the detecting device outputting respective signals for focusing respective objects located at a plurality of different areas, the camera having a zoom function for performing a zoom operation, the camera comprising:

an area selection circuit for selecting at least one area among the plurality of different areas; and a regulation circuit for regulating the zoom function in accordance with the selected area.

58. A camera having a detecting device, the detecting device outputting respective signals for focusing respective objects located at a plurality of different areas, the camera having a zoom function for performing a zoom operation, the camera comprising:

a determining circuit for determining whether or not the signal output from the detecting device is detectable for a specific area among the plurality of different areas; and an inhibiting circuit for inhibiting the zoom function when said determining circuit determines that the signal is undetectable for the specific area, said circuit inhibiting the zoom function when the signal is undetectable for the specific area even when said determining circuit determines that a signal is detectable for an area other than the specific area.

59. A camera having a detecting device, the detecting device outputting respective signals for focusing respective objects located at a plurality of different areas, the camera having a zoom function for performing a zoom operation, the camera comprising:

an area selection circuit for selecting one area among the respective areas; and a control circuit for making the zoom function operative on the basis of the signal outputted by the detecting device for a specific area independently of the area selected by said selecting circuit.

60. A camera having a detecting device, the detecting device outputting respective signals for focusing respective objects located at a plurality of different areas, the camera having a zoom function for performing a zoom operation, the camera comprising:

an area selection circuit for selecting at least one area among the plurality of different areas; and an inhibiting circuit for inhibiting the zoom function when a signal outputted by the detecting circuit for the area selected by said selecting circuit and a signal outputted by the detecting circuit for a specific area different from the selected area have a predetermined relationship.

61. A camera having an auto-focus mode and a manual focus mode, comprising:

selecting means for selecting one of the auto-focus mode and the manual focus mode;

a zoom circuit for shifting a zoom state of the camera; and a regulation circuit for regulating said zoom circuit in accordance with a selected mode.

62. A camera having a detecting device, the detecting device outputting respective signals for focusing respective objects located at a plurality of different areas, the camera having a zoom function for performing a zoom operation, the camera comprising:

an area selection circuit for selecting at least one area among the respective areas; and a control circuit for causing said selection circuit to select a specific area when making the zoom function operative.

63. A camera having a detecting device, the detecting device outputting respective signals for focusing respective objects located at a plurality of different areas, the camera having a zoom function for performing a zoom operation, the camera comprising:

an area selection circuit for selecting at least one area among the respective areas; and a control circuit for making the zoom function operative on the basis of the signal outputted by the detecting device for a specific area, different from the selected area, independently of the area selected by said selecting circuit.

* * * * *

UNITED STATES PATENT AND TRADEMARK OFFICE
CERTIFICATE OF CORRECTION

PATENT NO. : 5,604,562
DATED : February 18, 1997
INVENTOR(S) : KEISUKE AOYAMA

It is certified that error appears in the above-indentified patent and that said Letters Patent is hereby corrected as shown below:

ON THE COVER PAGE:

At [56] References Cited

Under "U.S. PATENT DOCUMENTS"

"5,051,766   7/1991   Nonaka et al." should read
--5,051,766   9/1991   Nonaka et al.--.

IN THE DISCLOSURE:

COLUMN 1

Line 39, "auto-zoom," should read --"auto-zoom,"--.
Line 67, "camera" should read --operation camera--.

COLUMN 8

Line 26, "Gives" should read --gives--.

COLUMN 11

Line 59, "Number" should read --number--.

UNITED STATES PATENT AND TRADEMARK OFFICE
CERTIFICATE OF CORRECTION

PATENT NO. : 5,604,562

DATED : February 18, 1997

INVENTOR(S) : KEISUKE AOYAMA

It is certified that error appears in the above-indentified patent and that said Letters Patent is hereby corrected as shown below:

COLUMN 12

Line 41, "photomerry." should read --photometry.--.

COLUMN 13

Line 12, "(c.1)" should read --(c.1),--.

COLUMN 19

Line 55, "is" should read --are--.

Signed and Sealed this

Nineteenth Day of August, 1997

*Attest:*

BRUCE LEHMAN

*Attesting Officer*  *Commissioner of Patents and Trademarks*